(12) United States Patent
Pontual et al.

(10) Patent No.: US 9,819,982 B2
(45) Date of Patent: *Nov. 14, 2017

(54) METHOD AND SYSTEM FOR CHANGING COMMUNICATION PARAMETERS OF A CONTENT DELIVERY SYSTEM BASED ON FEEDBACK FROM USER DEVICES

(71) Applicant: The DIRECTV Group, Inc., El Segundo, CA (US)

(72) Inventors: Romulo Pontual, Palos Verdes Estates, CA (US); John L. Norin, Redondo Beach, CA (US); Robert G. Arsenault, Redondo Beach, CA (US); Raynold M. Kahn, Los Angeles, CA (US); Sui-Ky Ringo Ling, Rancho Palos Verdes, CA (US); Luke J. Crook, Torrance, CA (US); John D. Choi, Los Angeles, CA (US); Michelle L. Vagnati, Los Angeles, CA (US); Stephen P. Dulac, Santa Clarita, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/240,387

(22) Filed: Aug. 18, 2016

(65) Prior Publication Data

US 2016/0360255 A1    Dec. 8, 2016

Related U.S. Application Data

(63) Continuation of application No. 13/111,221, filed on May 19, 2011, now Pat. No. 9,456,247.

(Continued)

(51) Int. Cl.
*H04N 21/472* (2011.01)
*H04N 21/262* (2011.01)
(Continued)

(52) U.S. Cl.
CPC ... *H04N 21/26283* (2013.01); *H04N 7/17318* (2013.01); *H04N 21/23617* (2013.01);
(Continued)

(58) Field of Classification Search
CPC ......... H04N 21/47202; H04N 21/2402; H04N 21/23617; H04N 21/26216; H04N 7/17318
See application file for complete search history.

(56) References Cited

U.S. PATENT DOCUMENTS 6,543,053 B1 * 4/2003 Li ..................... H04N 7/17318
                                                348/E7.071
6,802,077 B1 * 10/2004 Schlarb ................. H04N 7/165
                                                348/E5.006
(Continued)

*Primary Examiner* — Pinkal R Chokshi
(74) *Attorney, Agent, or Firm* — Harness, Dickey & Pierce, PLC

(57) ABSTRACT

A system and method for communicating content to a user device includes a head end that communicates a plurality of upcoming content metadata that includes a content title to the user device. The user device displays the upcoming content metadata and selects at least one upcoming content metadata from the plurality of upcoming content metadata to form selected data. The user device communicates the selected data to the head end. The head end adjusts head end communication parameters for the content associated with the selected data based on the selected data and communicates the content to a user device based on the head end communication parameters.

20 Claims, 20 Drawing Sheets

Related U.S. Application Data

(60) Provisional application No. 61/346,437, filed on May 19, 2010.

(51) Int. Cl.

| | | |
|---|---|---|
| *H04N 7/173* | (2011.01) | |
| *H04N 21/236* | (2011.01) | |
| *H04N 21/433* | (2011.01) | |
| *H04N 21/658* | (2011.01) | |
| *H04N 21/84* | (2011.01) | |
| *H04N 21/434* | (2011.01) | |
| *H04N 21/482* | (2011.01) | |
| *H04N 21/485* | (2011.01) | |

(52) U.S. Cl.
  CPC . *H04N 21/26216* (2013.01); *H04N 21/26266* (2013.01); *H04N 21/4334* (2013.01); *H04N 21/4345* (2013.01); *H04N 21/47202* (2013.01); *H04N 21/485* (2013.01); *H04N 21/4821* (2013.01); *H04N 21/6581* (2013.01); *H04N 21/84* (2013.01)

(56) References Cited

U.S. PATENT DOCUMENTS

| | | | | |
|---|---|---|---|---|
| 7,055,165 | B2* | 5/2006 | Connelly | H04H 60/06 348/E7.071 |
| 7,992,179 | B1* | 8/2011 | Kapner, III | H04N 7/17327 725/86 |
| 8,291,461 | B2* | 10/2012 | Thomas | G06F 3/0481 725/105 |
| 2002/0144260 | A1* | 10/2002 | Devara | H04N 21/2221 725/32 |
| 2002/0166121 | A1* | 11/2002 | Rovira | H04N 5/44543 725/41 |
| 2008/0148322 | A1* | 6/2008 | Howcroft | H04N 7/17318 725/87 |
| 2008/0192820 | A1* | 8/2008 | Brooks | H04N 7/17318 375/240.02 |
| 2009/0031345 | A1* | 1/2009 | Vagnati | H04N 7/17318 725/39 |
| 2009/0037961 | A1* | 2/2009 | Green | H04N 7/173 725/87 |
| 2009/0320084 | A1* | 12/2009 | Azam | H04N 7/17318 725/120 |

\* cited by examiner

METHOD AND SYSTEM FOR CHANGING COMMUNICATION PARAMETERS OF A CONTENT DELIVERY SYSTEM BASED ON FEEDBACK FROM USER DEVICES

CROSS-REFERENCE TO RELATED APPLICATIONS

This application is a continuation of U.S. patent application Ser. No. 13/111,221 filed on May 19, 2011, which claims the benefit of U.S. Provisional Application No. 61/346,437, filed on May 19, 2010. The entire disclosures of each of the above applications are incorporated herein by reference.

TECHNICAL FIELD

The present disclosure relates to a content processing and delivery system and, more specifically, to a method and system for changing parameters of a content delivery system using feedback from users from within the system.

BACKGROUND

The statements in this section merely provide background information related to the present disclosure and may not constitute prior art.

Satellite television is increasing in popularity due to the ever-increasing amount of programming as well as the quality of programming. Programming includes standard national (CONUS) broadcasts, local or regional station broadcasts, on-demand content and interactive content. Interactive content is increasing in popularity.

Satellite television broadcast systems typically use several satellites. Each satellite has several transponders that receive signals from the ground and broadcast the signals to users. Each transponder is capable of providing a certain amount of content therethrough. That is, each transponder may provide a certain bit rate therethrough. Satellite capacity may vary throughout the course of a day and course of a week. It is beneficial to the satellite system operator to use as much capacity as possible. The on-demand system provided by DIRECTV® uses broadband capacity as well as satellite capacity to communicate content to users. Broadband content is more expensive per bit than satellite content. Therefore, maximizing the use of the satellite for providing users desired content is beneficial.

SUMMARY

The present disclosure provides a system and method for providing content based on aggregated selections from multiple users.

In one aspect of the disclosure, a method includes communicating a plurality of upcoming content metadata that includes a content title, displaying the upcoming content metadata, selecting at least one upcoming content metadata from the plurality of upcoming content metadata to form selected data and communicating the selected data to a head end. The method also includes based on the selected data, adjusting head end communication parameters for the content associated with the selected data and communicating the content to a user device based on the head end communication parameters.

In another aspect of the disclosure, a system includes a user device and a head end that communicates a plurality of upcoming content metadata that includes a content title to the user device. The user device displays the upcoming content metadata and selects at least one upcoming content metadata from the plurality of upcoming content metadata to form selected data. The user device communicates the selected data to the head end. The head end adjusts head end communication parameters for the content associated with the selected data based on the selected data and communicates the content to a user device based on the head end communication parameters.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
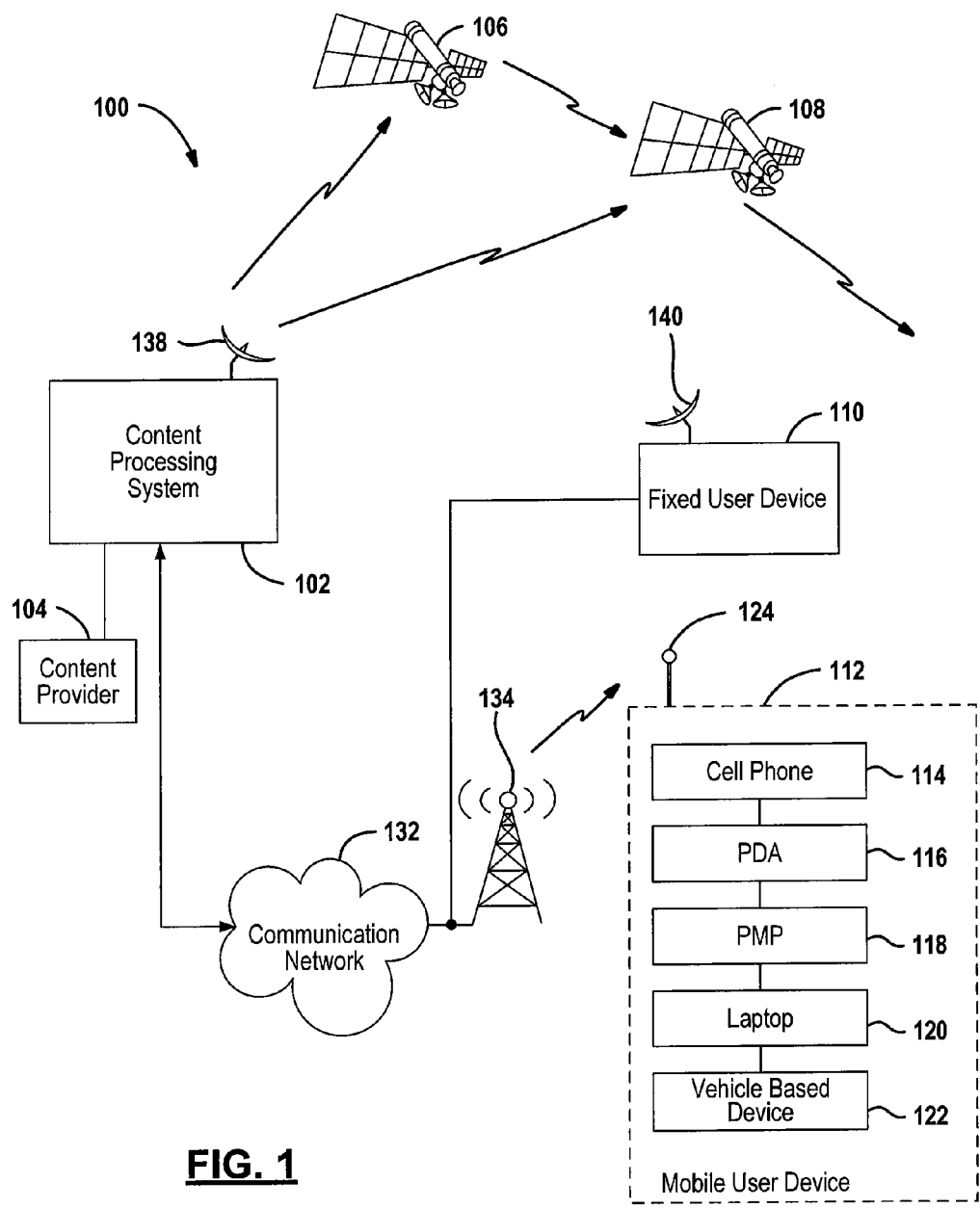
FIG. 1 is a schematic illustration of a communication system according to the disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure is set forth with respect to a satellite broadcast television system. In particular, the following disclosure is made with respect to DIRECTV® broadcast services and systems. It should be understood that many other delivery systems are readily applicable to disclosed systems and methods. Such systems include other wireless distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a head end (HE), integrated receiver/decoders (IRDs) and a content delivery network (CDN) as described below can be reallocated as desired without departing from the intended scope of the present patent.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

Referring now to FIG. 1, a content communication system 100 includes a content processing system 102 that is used as a processing and transmission source, a plurality of content providers, one of which is shown at reference numeral 104 and a first satellite 106. A second satellite 108 may also be incorporated into the system. The satellites 106, 108 may be used to communicate different types of information or different portions of various contents from the content processing system 102. The system 100 also includes a plurality of fixed user devices 110 such as integrated receiver/decoders (IRDs). Wireless communications are exchanged between the content processing system 102 and the fixed user devices 110 through one or more of the satellites 106, 108. The wireless communications may take place at any suitable frequency, such as but not limited to, for example, Ka band and/or Ku-band frequencies.

A mobile user device 112 may also be incorporated into the system. The mobile user device 112 may include, but is not limited to, a cell phone 114, a personal digital assistant 116, a portable media player 118, a laptop computer 120, or a vehicle-based device 122. It should be noted that several mobile devices 112 and several fixed user devices 110 may be used in the communication system 100. The mobile devices 112 may each have a separate antenna generally represented by antenna 124.

In addition to communication via the satellites 106, 108, various types of information such as security information, encryption-decryption information, content, or content portions may be communicated terrestrially. A communication network 132 such as the public switched telephone network (PSTN), a terrestrial wireless system, stratospheric platform, an optical fiber, or the like may be used to terrestrially communicate with the fixed user device 110 or the mobile user device 112. To illustrate the terrestrial wireless capability an antenna 134 is illustrated for wireless terrestrial communication to the mobile user device 112.

Data or content provided to content processing system 102 from the media source 104 may be transmitted, for example, via an uplink antenna 138 to the satellite(s) 106, 108, one or more of which may be a geosynchronous or geo-stationary satellite, that, in turn, rebroadcast the information over broad geographical areas on the earth that include the user devices 110, 112. The satellites may have inter-satellite links as well. Among other things, the example content processing system 102 of FIG. 1 provides program material to the user devices 110, 112 and coordinates with the user devices 110, 112 to offer subscribers pay-per-view (PPV) program services and broadband services, including billing and associated decryption of video programs. Non-PPV (e.g. free or subscription) programming may also be received. A carousel of multiple program materials may be scheduled within the content processing system 102 whereby the satellites 106, 108 may be used to communicate metadata and content to the user devices 110, 112. The repetition rate and blocks of content and metadata may vary as described below. To receive the information rebroadcast by satellites 106, 108, each for user device 110 is communicatively coupled to a receiver or downlink antenna 140.

Security of assets broadcast via the satellites 106, 108 may be established by applying encryption and decryption to assets or content during content processing and/or during broadcast (i.e., broadcast encryption). For example, an asset can be encrypted based upon a control word (CW) known to the content processing system 102 and known to the user devices 110, 112 authorized to view and/or playback the asset. In the illustrated example communication system 100, for each asset the content processing system 102 generates a control word packet (CWP) that includes, among other things, a time stamp, authorization requirements and an input value and then determines the control word (CW) for the asset by computing a cryptographic hash of the contents of the CWP. The CWP is also broadcast to the user devices 110, 112 via the satellites 106, 108. The user devices authorized to view and/or playback the broadcast encrypted asset will be able to correctly determine the CW by computing a cryptographic hash of the contents of the received CWP. If the user device 110 is not authorized, the user device 110 will not be able to determine the correct CW that enables decryption of the received broadcast encrypted asset. The CW may be changed periodically (e.g., every 30 seconds) by generating and broadcasting a new CWP. In an example, a new CWP is generated by updating the timestamp included in each CWP. Alternatively, a CWP could directly convey a CW either in encrypted or unencrypted form. Other examples of coordinated encryption and decryption abound, including for example, public/private key encryption and decryption.

Figure 2:
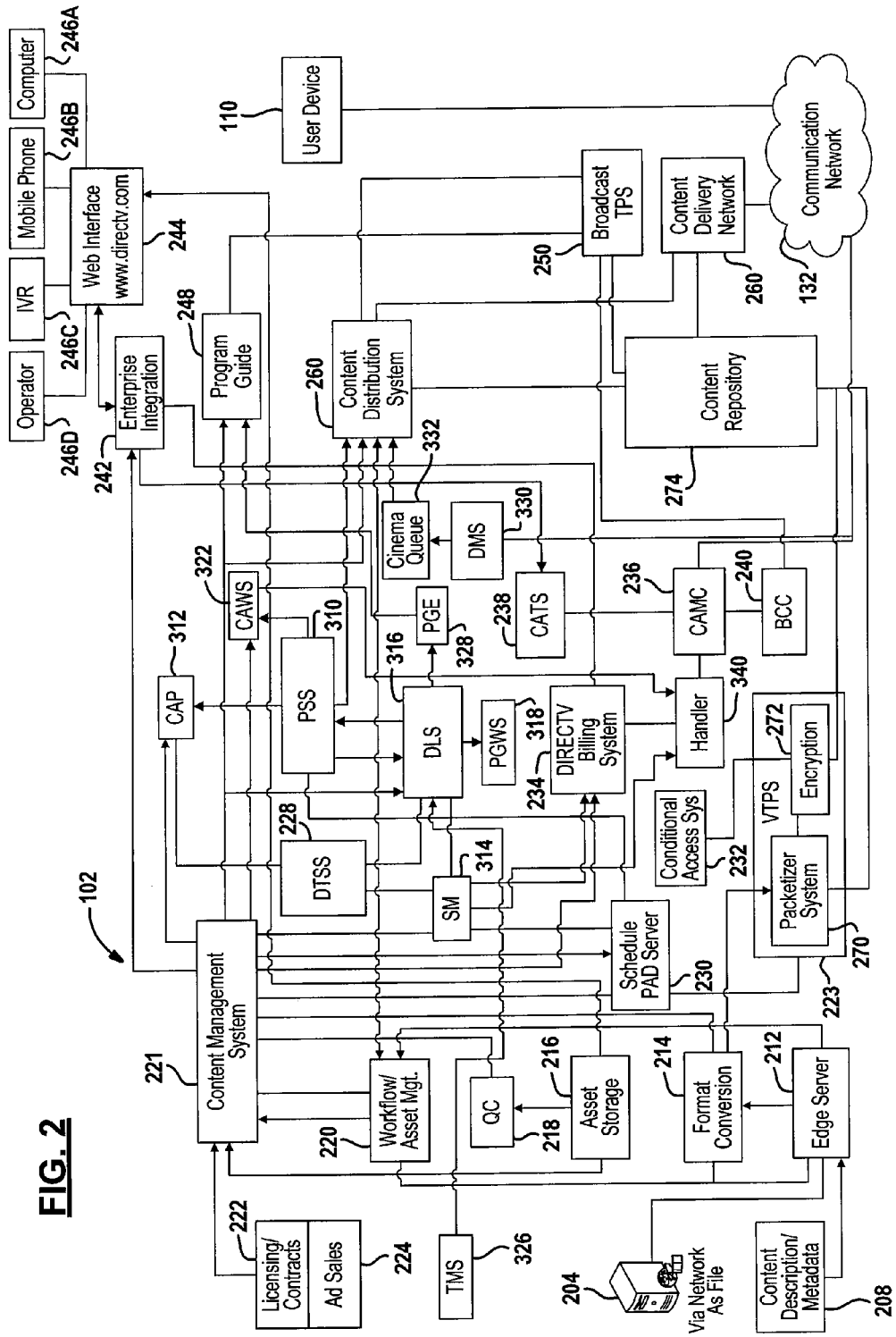
FIG. 2 is a detailed block diagrammatic view of the content processing system of FIG. 1.

Referring now to FIG. 2, the content processing system 102 of FIG. 1 is illustrated in further detail. The content processing system may also be referred to as a head end. The content provider 104 may include various types of content providers, including those that provide content via a network as a file in 204, or by way of a satellite, or by way of recorded media such as DVD, tapes and other means. The content provider 104 may also provide a content description and other metadata 208 to the system. An input server 212 such as an edge server may receive the various content and associated metadata and convert the format in a format conversion system 214. A house format asset storage server 216 may be used to store the content asset in a house format. Still image files, trailers, and other information may also be stored in the house format asset storage server. A quality control system 218 may monitor files for quality and completeness.

A workflow management system 220 is used to control the format conversion system 214 and the server 212. Also, the workflow management system 220 is coupled to the house format asset storage server 216 and performs ingest control. The house format asset storage server 216 provides still images to a content management system 221 and house format file, video and audio files to the video transport processing system 223.

The content management system 221 may also receive file properties from the quality control system 218.

The video transport processing system (VTPS) 223 may encode the packets containing the content. The encoder may encode the data into various transport formats such as DIRECTV® proprietary formats, or industry standard formats. The encoded data is then packetized into a stream of data packets by a packetizer 270 that creates pre-packetized unencrypted files. The packetizer 270 also attaches a header to each data packet to facilitate identification of the contents of the data packet such as, for example, a sequence number that identifies each data packet's location within the stream of data packets (i.e., a bitstream). The header also includes a program identifier (PID) (e.g., a service channel identifier (SCID)) that identifies the program to which the data packet belongs.

An encryption module 272 receives the output of the packetizer system 223 and encrypts the packets. The stream of data packets (i.e., a bitstream) is then broadcast encrypted by, for example, the well-known Advanced Encryption Standard (AES) or the well-known Data Encryption Standard (DES). In an example, only the payload portion of the data packets are encrypted thereby allowing a user device 110 to filter, route and/or sort received broadcast encrypted data packets without having to first decrypt the encrypted data packets. Fully packaged and encrypted files may also be stored in the content repository 274. Encryption may take place in the data portion of a packet and not the header portion.

The content management system (CMS) 221 generally controls the overall movement and distribution of content through the content processing system 102. The CMS 221 may be used to generate which content delivery network is to be used by generating a content delivery network identification. This will be described further below.

A licensing and contract information 222 and ads from ad sales 224 may be provided to the content management system 221. That is, licensing information, tier assignments, pricing and availability may be provided to the content management system. Asset information, file names and durations may be exchanged between the content management system 221 and the workflow management system 220. The asset information, such as file names and durations, may be determined at the server 212 that is coupled to the workflow management system 220.

A schedule PAD server (SPS) 230 may be coupled to the Content Management System (CMS) 221. The CMS 221 in combination with the SPS (230) is used to provide the requested channel, program associated data (PAD), channel information and program information packets (PIPs). The CMS 221 may schedule content processing for a plurality of received assets based on a desired program lineup to be offered by the communication system 100. For example, a live TV program for which a high demand for reruns might be expected could be assigned a high priority for content processing.

The schedule PAD server (SPS) 230 may be used to generate a broadband video PAD that is communicated to a conditional access system for broadband video 232. The conditional access system for broadband video 232 may be used to generate control words and control word packet in pairs and provide those to the video transport processing system 223.

In the illustrated example of FIG. 2, users of the user devices 110 (of FIG. 1) are charged for subscription services and/or asset downloads (e.g., PPV TV) and, thus, the content processing system 102 includes a billing system 234 to track and/or bill subscribers for services provided by the system 100. For example, the billing system 234 records that a user has been authorized to download a movie and once the movie has been successfully downloaded the user is billed for the movie. Alternatively, the user may not be billed unless the movie has been viewed. The billing system 234 records that a user has been authorized to view a movie once an unlocking signal is received, and the user is billed for the movie. The billing system may receive an unlocking signal comprising a purchase request from the user. In this example the user may order the movie by way of a computer 246A connecting to a website, a mobile phone 246B, an interactive voice system 246C and by a phone call to an operator 246D. The billing system 234 may bill the user account and send an authorization signal to the user device 110. The billing system 234 may also receive an unlocking signal comprising a report back that content has been unlocked at the user device. In this example, the user may order the movie via a user interface purchase menu of the user device. The user device may allow viewing, and may report back the unlocking signal by way of a phone connection or a broadband connection to the head end. The billing system 234 may bill the user account when the report back is received. As will be described further below, content may be stored in a user device but may not be accessible until it is played back. Some content may never be unlocked. When the content is unlocked such as played back, the user account is billed with the unlock signal that is communicated back to the billing system 234. Push content, wanted list content or other content not specifically requested may be unlocked in this manner.

A billing system 234 receives pricing and availability information from the content management system 221. A conditional access system 236 receives callback information from the communication network 132. The conditional access system 236 may be used to generate authorizations, pay-per-view billing data, and callback data from the billing system 234. Remote record requests may also be provided from the conditional access transaction system 238. A conditional access system BCC 240 may be used to generate a conditional access packet (CAP) from the information from the conditional access system 236. The CAP may include a content title to be added to the wanted list at the user device.

The CAP may also include the network location, channel and time that content will be broadcasted so that the user device may be tuned to it to record the content. The CAP may also include a content authorization signal so that the user device may allow the content to be viewed.

The billing system 234 may generate purchase data that is provided to the enterprise integration (EI) block 242. The enterprise integration block 242 may generate remote record requests to the conditional access transaction system 238. Content purchase requests and remote record requests may be generated through a web interface such as DIRECTV®.com in block 244. Access to the website 244 may be obtained in numerous ways including through a computer 246A, a mobile phone 246B, an interactive voice system 246C and by an operator 246D. The computer 246A may be in communication with the web interface 244 through the internet, or the like. A website may prompt the user for ordering various content. Likewise, the mobile phone 246B may be in communication with the web interface. The mobile phone 246B may be a web-enabled device that allows access to the internet. An interactive voice recognition system 246C may provide the user prompts for ordering specific content. The user of the system may also contact the operator 246D who can interact with the web interface 244 on behalf of the user.

Various ordering information, such as ordering broadband video, pay-per-view, wanted list additions and various services may be received at the web interface 244. Various trailers may also be accessed by the users through the web interface 244 provided from the house format asset storage server 216. Enterprise integration block 242 may also receive guide information and metadata from the content management system 221.

Titles, description and various categories from the content management system 221 may be provided to the advanced program guide system 248. The program guide system 248 may be coupled to a satellite broadcasting system such as a broadcast transport processing system 250 that broadcasts content to the users through the satellite 106, 108.

The program guide data generated by the program guide system 248 may include information that is used to generate a display of guide information to the user, wherein the program guide may be a grid guide and informs the user of particular programs that are broadcast on, particular channels at particular times. A program guide may also include information that a user device uses to assemble programming for display to a user. For example, the program guide may be used to tune to a channel on which a particular program is offered. The program guide may also include a content delivery network identifier through which content is available for downloading. The program guide may also contain information for tuning, demodulating, demultiplexing, decrypting, depacketizing, or decoding selected programs.

Content files may also be provided from the content management system 221 to the content distribution system 260.

One or more content delivery networks 280 may be used to provide content files such as encrypted or unencrypted and packetized files to the communication network 132 for distribution to the user devices 110, 112. The content distribution system 260 may make requests for delivery of the various content files and assets through the communication network 132. The content distribution system 260 also generates satellite requests and broadcasts various content and assets through the broadcast transport processing system 250.

The communication network 132 may be the Internet 122 which is a multiple-point-to-multiple-point communication network. However, persons of ordinary skill in the art will appreciate that point-to-point communications may also be provided through the communication network 132. For example, downloads of a particular content file from a content delivery network may be communicated to a particular user device. Such file transfers and/or file transfer protocols are widely recognized as point-to-point communications or point-to-point communication signals and/or create point-to-point communication paths, even if transported via a multi-point-to-multi-point communication network such as the Internet. It will be further recognized that the communication network 132 may be used to implement any variety of broadcast system where a broadcast transmitter may transmit any variety of data or data packets to any number of or a variety of clients or receivers simultaneously. Moreover, the communication network 132 may be used to simultaneously provide broadcast and point-to-point communications and/or point-to-point communication signals from a number of broadcast transmitters or content delivery networks 280.

The content delivery network 280 may be implemented using a variety of techniques or devices. For instance, a plurality of Linux-based servers with fiber optic connections may be used. Each of the content delivery networks 280 may include servers that are connected to the Internet or the communication network 132. This allows the user devices to download information or content (example, a movie) from the content delivery network 280. The content delivery network 280 may act as a cache for the information provided from the content repository 274. A particular user device may be directed to a particular content delivery network 280 depending on the specific content to be retrieved. An Internet uniform resource locator (URL) may be assigned to a movie or other content. Further, should one of the delivery networks 280 have heavy traffic, the content delivery network may be changed to provide faster service. In the interest of clarity and ease of understanding, throughout this disclosure reference will be made to delivering, downloading, transferring and/or receiving information, video, data, etc. by way of the content delivery network 280. However, persons of ordinary skill in the art will readily appreciate that information is actually delivered, downloaded, transferred, or received by one of the Internet-based servers in or associated with the content delivery network 280.

It should be appreciated that the content delivery network 280 may be operated by an external vendor. That is, the operator of the content delivery network 280 may not be the same as the operator of the remaining portions of the content processing system 102. To download files from the content delivery network 280, user devices 110, 112 may implement an Internet protocol stack with a defined application layer and possibly a download application provided by a content delivery network provider. In the illustrated example, file transfers are implemented using standard Internet protocols (file transfer protocol FTP), hyper text transfer protocol (HTTP), etc. Each file received by the user device may be checked for completeness and integrity and if a file is not intact, missing, and/or damaged portions of the files may be delivered or downloaded again. Alternatively, the entire file may be purged from the IRD and delivered or downloaded again.

The broadcast transport processing system 250 may provide various functions, including packetizing, multiplexing and modulating, and uplink frequency conversion. RF amplification may also be provided in the broadcast transport processing system 250.

Wireless delivery via the satellites 106, 108 may simultaneously include both files (e.g., movies, pre-recorded TV shows, games, software updates, asset files, pushed content, wanted list content, etc.) and/or live content, data, programs and/or information. Wireless delivery via the satellites 106, 108 offers the opportunity to deliver, for example, a number of titles (e.g., movies, pre-recorded TV shows, etc.) to virtually any number of customers with a single broadcast. As will be described below, the content may be carouselled to repeatedly provide content to customers on a push basis or as requested through a wanted list.

In contrast, Internet-based delivery via the CDN 280 can also support a large number of titles, each of which may have a narrower target audience. Further, Internet-based delivery is point-to-point (e.g., from an Internet-based content server to a user device 110, 112) thereby allowing each user of the user device 110, 112 to individually select titles. Allocation of a title to satellite and/or Internet-based delivery or content depends upon a target audience size and may be adjusted over time. For instance, a title having high demand (i.e., large initial audience) may initially be broadcast via the satellites 106, 108, then, over time, the title may be made available for download via the CDN 280 when the size of the target audience or the demand for the title is smaller. A title may simultaneously be broadcast via the satellites 106, 108 and be made available for download from the CDN 280 via the communication network 132.

In the example communication system 100, each asset (e.g., program, title, content, game, TV program, etc.) is pre-packetized and, optionally, pre-encrypted and then stored as a data file (i.e., an asset file). Subsequently, the asset file may be broadcast via the satellites 106, 108 and/or sent to the CDN 280 for download via the CDN 280 (i.e., Internet-based delivery). In particular, if the data file is broadcast via the satellites 106, 108, the data file forms at least one payload of a resultant satellite signal. Likewise, if the data file is available for download via the CDN 280, the data file forms at least one payload of a resultant Internet signal.

It will be readily apparent to persons of ordinary skill in the art that even though the at least one payload of a resultant signal includes the data file regardless of broadcast technique (e.g., satellite or Internet), how the file is physically transmitted may differ. In particular, transmission of data via a transmission medium (e.g., satellite, Internet, etc.) comprises operations that are: (a) transmission medium independent and b) transmission medium dependent. For example, transmission protocols (e.g., transmission control protocol/Internet protocol (TCP/IP), user datagram protocol (UDP), encapsulation, etc.) and/or modulation techniques (e.g., quadrature amplitude modulation (QAM), forward error correction (FEC), etc.) used to transmit a file via Internet signals (e.g., over the Internet 122) may differ from those used via satellite (e.g., the satellites 106, 108). In other words, transmission protocols and/or modulation techniques are specific to physical communication paths, that is, they are dependent upon the physical media and/or transmission medium used to communicate the data. However, the content (e.g., a file representing a title) transported by any given transmission protocol and/or modulation is agnostic of the transmission protocol and/or modulation, that is, the content is transmission medium independent.

The same pre-packetized and, optionally, pre-encrypted, content data file that is broadcast via satellite may be available for download via Internet, and how the asset is stored, decoded and/or played back by the user devices 110 is independent of whether the program was received by the user devices 110 via satellite or Internet. Further, because the example content processing system 102 of FIG. 1 broadcasts a live program and a non-live program (e.g., a movie) by applying the same encoding, packetization, encryption, etc., how a program (live or non-live) is stored, decoded and/or played back by the user devices 110 is also independent of whether the program is live or not. Thus, user devices 110, 112 may handle the processing of content, programs and/or titles independent of the source(s) and/or type(s) of the content, programs and/or titles. In particular, example delivery configurations and signal processing for the example content delivery system of FIG. 2 are discussed in detail below.

A push scheduling system 310 is used for pushing content to the various user devices. Push content is content that is not requested by a user but is delivered to a user device for eventual or possibly eventual use by the user. The push scheduling system 310 may be in communication with a conditional access processor 312. The conditional access processor 312 may be used for requesting program-associated data such as future program-associated data, current program-associated data, or ending program-associated data. The program-associated data may be a variety of data files including duration, actors, directors, short description, the studios, or various other types of metadata. The program-associated data may be accessed from the content management system 221 or push scheduling system 310. The schedule pad server 230 may receive the program-associated data and deliver the program-associated data to various devices.

The schedule pad server 230 may update a schedule manager 314 with the results of processing program-associated data. The schedule manager 314 may be in communication with the traffic and scheduling system 228. The schedule manager may generate event code pricing which is provided to the DIRECTV® listing service (DLS) 316.

The program guide web service (PGWS) 318 may receive listings from the DIRECTV® listing service 316 so that access to program guide information may be communicated via the internet. The program guide web service 318 may interface with the web interface and other service partners for providing programming data thereto.

The PSS 310 may also be in communication with a conditional access web service 322. The conditional access web service 322 may provide a web service for processing conditional access data. The schedule manager 314 may send a content reference identifier (CRID) update to the conditional access web service through the content management system and may process requests from the push schedule to remove or cancel content that has been previously pushed to the user.

The listing service 316 may also supply content material such as metadata to the push scheduler 310. The channel data may include, but is not limited to, channel start time, a channel stop time, a content channel bit rate, a transponder identifier, and a service channel identifier. CRID and scheduling data may be requested by the DLS from the push scheduler 316.

An external content data source 326, such as Tribune Media Services® (TMS) may provide data to the listing service 316. Content identifiers that uniquely identify each content may be provided to the listing service 316. The external source 326 can provide description data, actor data, poster data, studio data, pictures, trailers and the like to the content processing system 102.

A program guide extractor (PGE) 328 receives schedule data from the listing service and provides the schedule data to the content distribution system 260. The program guide extractor communicates data that is eventually used in the program guide system 248.

A diagnostic monitoring server (DMS) 330 is in communication with a user device. The user device communicates callback information and data through the diagnostic monitoring server 330. The diagnostic monitoring server 330 may be in communication with a cinema queue 332. The cinema queue 332 may include an external identifier such as a TMS identifier, a format, material identifiers, the ranking of each TMS ID and the number of customers with the TMS ID on the cinema queue 332. The daily ranking score of the material may be calculated with the material from the cinema queue 332 so that the content may be organized for distribution through the carrousel. The repetition rate and the frequency of the carrousel may be adjusted based upon the data from the cinema queue 332.

A handler 340 receives data from the conditional access web server 322 and control the communication to the CAMC 236.

Figure 3:
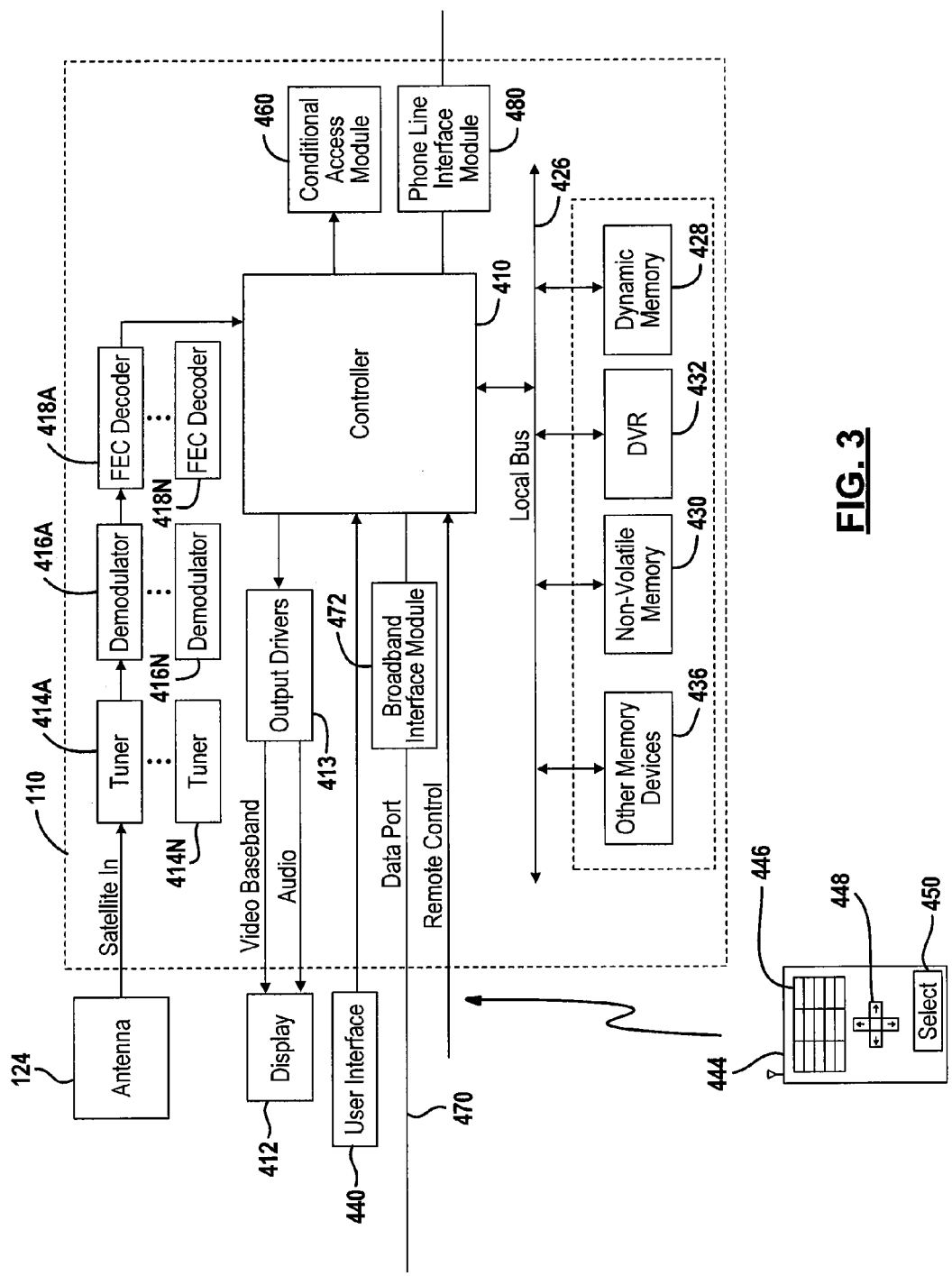
FIG. 3 is a detailed block diagrammatic view of the fixed user device of FIG. 1.

Referring now to FIG. 3, a user device 110 such as a fixed user device is illustrated. A similar configuration for a mobile user device may also be used. A fixed user device may include a fixed antenna. If the system is a mobile user device, the antenna 124 may be a rotating antenna that is used to track the relative movement of the satellite or an omni-directional antenna that can receive antenna signals from various directions.

The user device 110 may include a controller 410. The controller 410 may control various operations as will be described below. The user device 110 may be in communication with a display 412 through output drivers 413. The output drivers 414 may generate desired audio and video output formats suitable for the particular display 412.

The controller 410 may be a general processor such as a microprocessor. The controller 410 may be used to coordinate the control and the functions of the user device. These functions may include the functions of a tuner 414, a demodulator 416, a forward error correction decoder 418 and any buffers or other functions. More than one tuner, demodulator and FEC decoder may be provided as indicated by the reference numerals "A" and "N". One constructed embodiment may include four tuners, demodulators and decoders, although various numbers of tuners, demodulators and decoders may be provided depending upon the system requirements. The tuner 414 receives the signal or data from the individual channel. The demodulator 416 demodulates the signal to form a demodulated signal or demodulated data. The decoder 418 decodes the demodulated signal to form a decoded data or decoded signal.

The controller may also be coupled to a local bus 426. The local bus 426 may be used to couple a memory, including a dynamic memory 428, such as RAM which changes often and whose contents may be lost upon the interruption of power or boot up. The bus 426 may also be coupled to a non-volatile memory 430. One example of a non-volatile memory is an EEPROM. One specific type of EEPROM is flash memory. Flash memory is suitable since it is sectored into blocks of data that may be individually erased and rewritten.

A digital video recorder 432 may also be in communication with the local bus 426. The digital video recorder 432 may be used for storing various data and various content. The various data stored within the DVR may include metadata such as titles, actors, directors, descriptions, posters, identifiers, availability start times, availability end times, pricing data, timing data and various other types of data.

Other memory devices 436 may also be coupled to the local bus 426. The other memory devices may include other types of dynamic memory, non-volatile memory, or may include removable memory devices. The display 412 may be changed under the controller 410 in response to data in the dynamic memory 428 or non-volatile memory 430.

The controller 410 may also be coupled to a user interface 440. The user interface 440 may be various types of user interfaces such as a keyboard, push buttons, a touch screen, a voice activated interface, or the like. The user interface 440 may be used to select a channel, select various information, change the volume, change the display appearance, or other functions. The user interface 440 may be used in addition to a remote control device 444. The remote control device may include a keypad 446, an arrow keypad 448, and a select button 450. Inputs to the user device may be provided by the remote control device or through the user interface 440.

A conditional access module card 460 (CAM) may also be incorporated into the user device. Access cards, such as a conditional access module, may be found in DIRECTV® units. The access card 460 may provide conditional access to various channels and wireless signals generated by the system. The access card 460 may control the decryption of program content. Not having an access card or not having an up-to-date access card 460 may prevent the user from receiving or displaying various video and other content from the system.

The controller 410 may also be in communication with a data port 470. The data port 470 may be a broadband data port that is coupled to the controller 410 through a broadband interface module 472. The broadband interface module 472 may allow wireless or wired communication between external devices with the controller 410. The controller 410 through the broadband interface module 472 may communicate with the internet and various systems such as the head end of the content communication system. Callback signals may be provided through the broadband interface module 472 from the controller 410.

The controller 410 may also be in communication with a phone link interface module 480. The phone link interface module 480 may couple the user device 110 to a PSTN. The user device 110 may generate callback signals to the head end through the phone interface module 480.

Callback signals provided through the broadband interface module 472 and the phone interface module 480 may include ordering information and wanted list information. The wanted list information may be provided to the cinema queue 332 illustrated in FIG. 2. The wanted list data may be used to control the parameters of the content distribution system 260.

Figure 4:
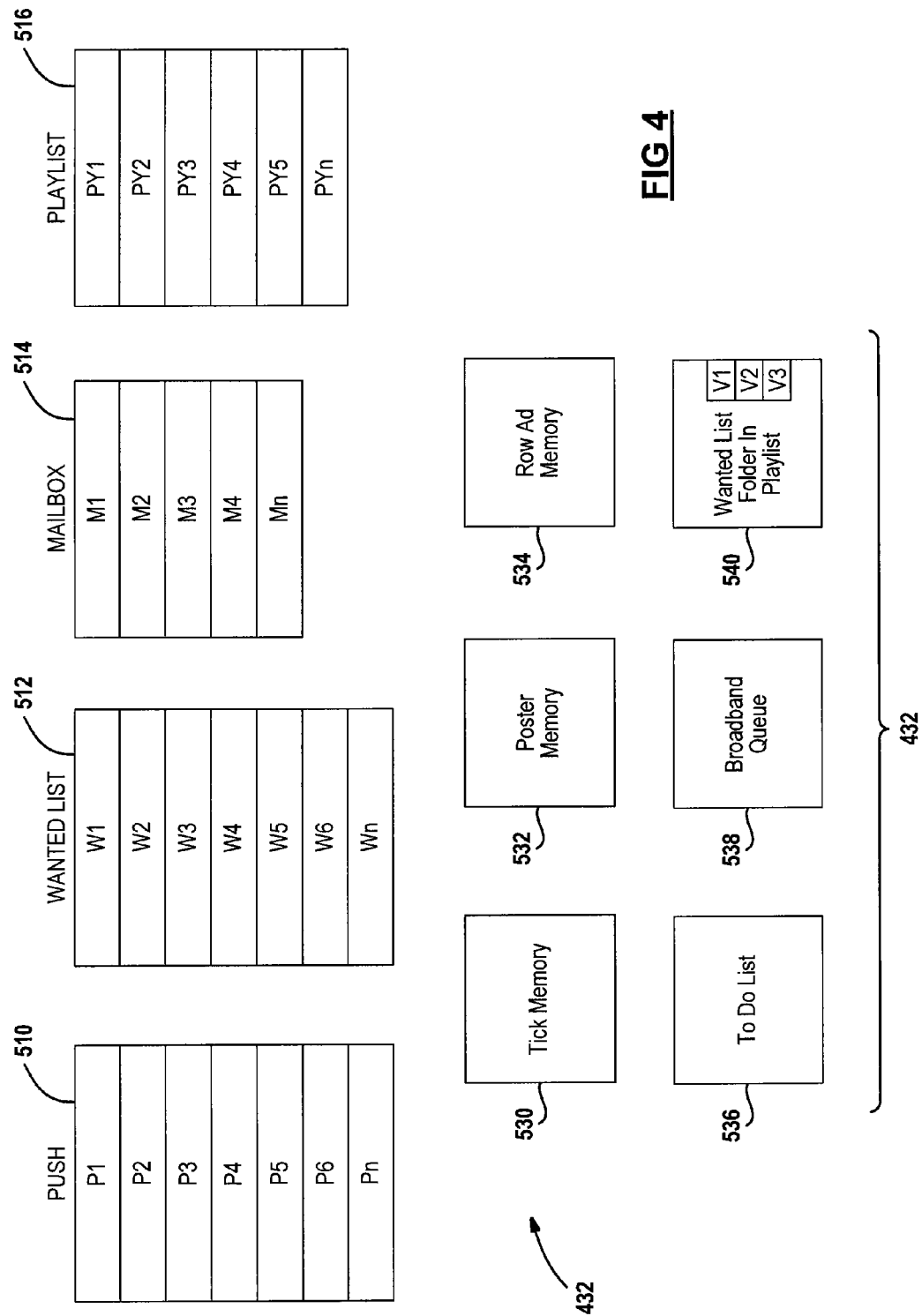
FIG. 4 is a block diagrammatic representation of the memory of the user device.

Referring now to FIG. 4, the memory 432 is illustrated in further detail. The memory 432 is a DVR. However, the memory 432 may be implemented in a hard drive or in various types of memory such as a flash memory. The memory 432 is used for storing content data or content or both. The memory 432 may be allocated in various ways. A push memory block 510 is illustrated having push memory slots P1 through Pn. Various numbers of push memory slots may be provided for storing push memory content and push memory data associated with the content. The push content data may be metadata.

A wanted list memory block 512 may also be provided. The wanted list memory block 512 may provide various numbers of wanted list slots W1 through Wn for storing wanted list data. As will be described below, the wanted list data may store content titles or other types of data for identifying content desired or that the user wants to be provided to the user device.

Mailbox memory 514 provides mailbox memory slots for storing content communicated to the user device in response to the wanted list entries. Various numbers of mailbox slots M1 to Mn may be provided. In this example, five slots are illustrated. The number of wanted list content files may limit the number of wanted list content titles available prior to viewing or reallocating the content to another memory.

A playlist memory 516 may also be provided. The playlist memory 516 may contain various content and content data associated with a playlist slot that is available for immediately play out on the user device. The playlist may have multiple slots PY1-PYn. The number of slots may vary depending on design considerations and the size of available memory. Although six slots are illustrated, more or fewer slots may be used. Tens of hundreds of slots may be available if the memory is suitably sized.

Various other types of memory may also be provided within the user device. For example, a tick memory 530 may be used to keep track of the content that is already downloaded into the user device. The tick memory 530 may thus allow the screen display to display a tick mark or other type of indicator indicating that content is available for immediate playback.

A poster memory 532 may also be provided within the user device. The poster memory 532 may store posters for various content such as movies. The poster memory 532 may include current posters and past posters so that posters are not required to be updated.

A row advertisement (ad) memory 534 may also be included within the memory 432. The row ad memory 534 may be used to generate single line graphical images in the program guide display. The row ad memory may include smart row ads that are displayed when particular content becomes available as will be described further below.

A to-do list memory 536 may also be provided within the memory 432. The to-do list 536 may provide a list of content that is to be downloaded from linear content. The to-do list may include content that is less than a predetermined amount of time from being broadcast. For example, the to-do list may include a list of content that is within 30 minutes of being broadcasted. From the to-do list 536 content may be scheduled to be recorded.

A broadband queue 538 may include a list of content that is to be received through a broadband connection. The broadband queue 538 may have various titles, priorities, and the like associated with the content.

A wanted list folder 540 may also be included within the memory 432. The wanted list folder may be a virtual folder that is for indicating the availability of mailbox memory content 514 in the play list. The wanted list folder may have slots V1-V3 that are user allocated so that a predetermined number of mailbox content may be indicated or displayed within the playlist. In the present example, three wanted lists or virtual folder examples may be provided based upon content from the mailbox 514.

Figure 5:
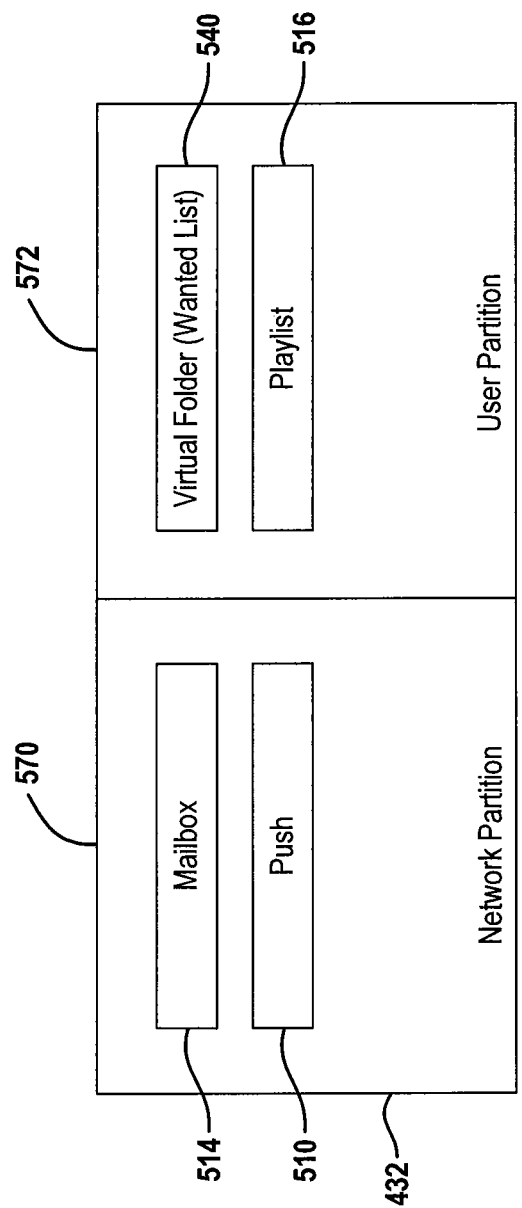
FIG. 5 is a block diagrammatic view of the memory illustrating the network partition and user partition.

Referring now to FIG. 5, the memory 432 may include a network partition 570 and a user partition 572. Different types of content or assets may be stored in the network partition 570 and the user partition 572. The stored content in the different partitions may relate to the type of content. Carrying forward with the example provided in FIG. 4, mailbox memory 514 and push memory 510 may be included within the network partition 570. The network partition 570 may not be readily accessible by the user. Only upon certain conditions or certain activations may the content be made available typically through the user partition 572. Examples of content within the user partition 522 may include the virtual folder or wanted list folder 540 and the playlist 516. Virtual folder 540 content is derived from the mailbox 514. When a virtual folder slot is open, content from a mailbox slot such as the highest priority mailbox slot may be provided to the virtual folder 514. This will be further described below.

Figure 6:
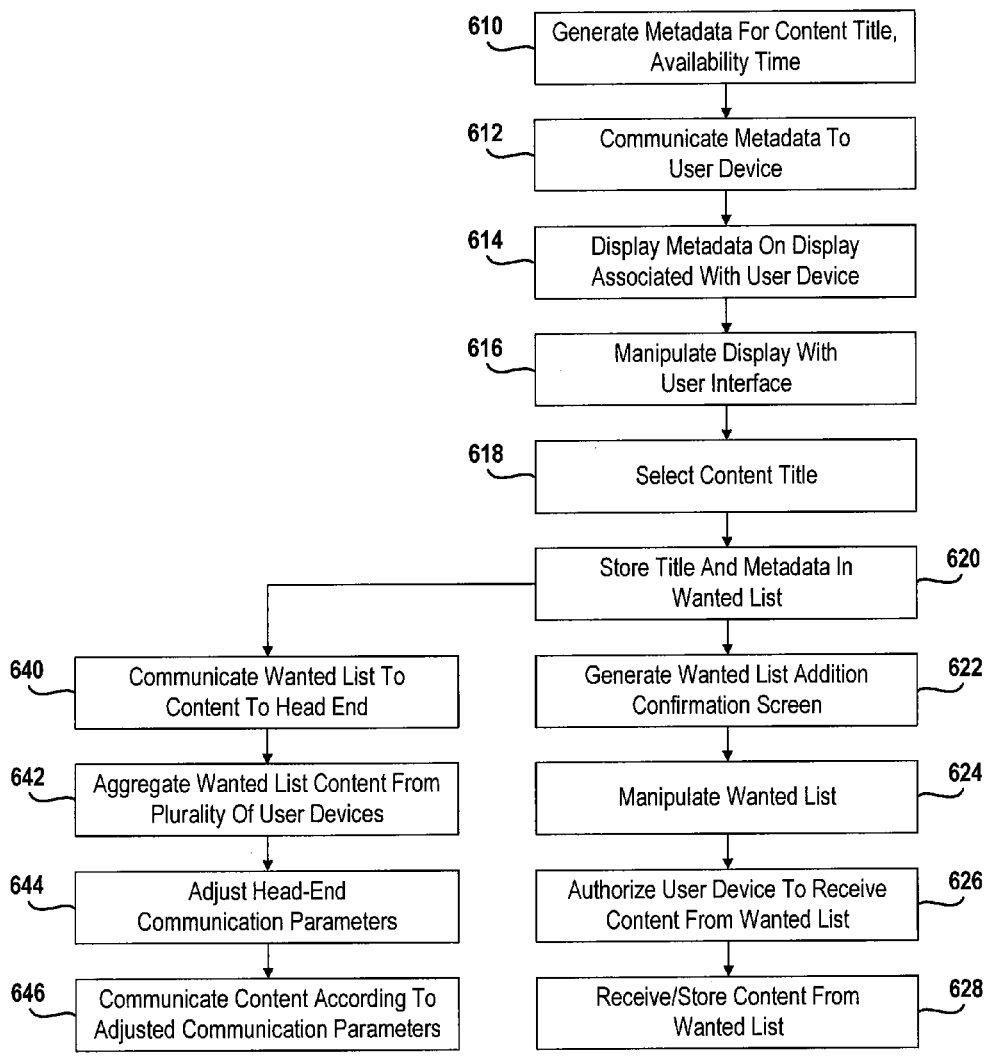
FIG. 6 is a flowchart of a method for forming a wanted list according to the present disclosure.

Referring now to FIG. 6, a method for generating a wanted list is set forth. As mentioned above, a wanted list is a prioritized list that is used for booking the recording of content titles. Content with higher priority is typically booked first based upon the availability of the content.

In step 610, metadata is created for the content. The metadata may include a content title, an availability start time, an availability end time, various information about the title such as the actors, the rating, the studio, a description, and other data. It should be noted that metadata may be created for content that is currently available and for content that will be available in the future. Future content may be referred to as upcoming content. The metadata may be gathered from a variety of sources such as the content description/metadata block 208 and the external data provider 326 illustrated in FIG. 2.

In step 612, the metadata is communicated to the user device. The metadata may be communicated to the user device through a broadband connection such as the internet or through the satellite. In step 614, the metadata may be displayed on a display that is associated with the user device. It should be noted that the user device may be the set top box or other hand-held device. The user device, in this instance, may also be another device that is in communication with the web interface 244 of FIG. 2. The web interface 244 may have the devices 246A through 246D coupled thereto.

In step 616, the display may be manipulated with the user device. That is, the display may have menus and submenus for locating various content. The display may also include search capabilities for searching for specific content. Examples of menus and submenus will be illustrated below.

In step 618, a content title from one of the displays is selected for inclusion in a wanted list or queue. The selection may be made by a user interface such as a remote control or push buttons associated with the user device.

In step 620, the title and metadata that is associated with the title may be stored in a wanted list. A prompt, after selection in step 618, may be provided to the user through the user interface. The prompt may query whether addition to a wanted list is desired by the user. In step 622, when the content is desired to be stored within the wanted list, a confirmation screen may be generated to inform the user that the wanted list has been added to.

In step 624, the wanted list may be manipulated. By displaying the wanted list through the various menus, the wanted list may be reprioritized. By selecting a content title within the wanted list, prompts may be provided for moving the content up or down or higher or lower in priority.

In step 626, the authorization for the wanted list may be periodically communicated from the head end so that the user device can receive and store content from the wanted list in step 628. Authorization may be provided by communicating a location such as the location of a content delivery network or the location of the satellite delivery system and a sublocation therein for tuning the user device to receive the content. Authorization may be provided by communicating timing information including scheduled broadcast times and availability start and end times for the content. The tuning information and timing information for the content may be added to the metadata communicated in the program guide data from the head end. A conditional access packet may also be generated at the content communication system or head end that provides authorization and a location and time for retrieving the content. A conditional access packet may also be generated at the head end that provides a content title to be added to the wanted list of a user device. In this manner a wanted list from a first user device may be added to the wanted list of a second user device. For example, a PC or a mobile user device may communicate a wanted list selection to the head end, which may further communicate the wanted list selection to a fixed user device for recording from a satellite. When a content title is at the top of the wanted list, the user device may receive and store content from the wanted list, in step 628. It should be noted that the highest priority content may not yet be available and thus the highest available content may be retrieved and stored by the user device. The content may be obtained through a satellite or through a broadband connection. The process for retrieving the content will be described further below.

Referring back to step 620, once a wanted list has been established, the wanted list content may be communicated to the head end in step 640. In step 642, the head end aggregates the wanted lists from a plurality of user devices. In step 644, the head end communication parameters are adjusted based upon the contents of the wanted list of the various users. In step 646, the head end communicates the content according to the adjusted communication parameters. Examples of the head end adjusting the communication parameters may include adjusting the size of the blocks within a carousel, adjusting the frequency of the blocks within a carousel, adjusting the number of carousels that include the particular content for the content title and other parameters. By adjusting the communication parameters, faster or slower delivery to the delivery devices may be performed. For example, by providing increased content frequency within the carousel, the receiving of a particular content title may be more likely.

Figure 7:
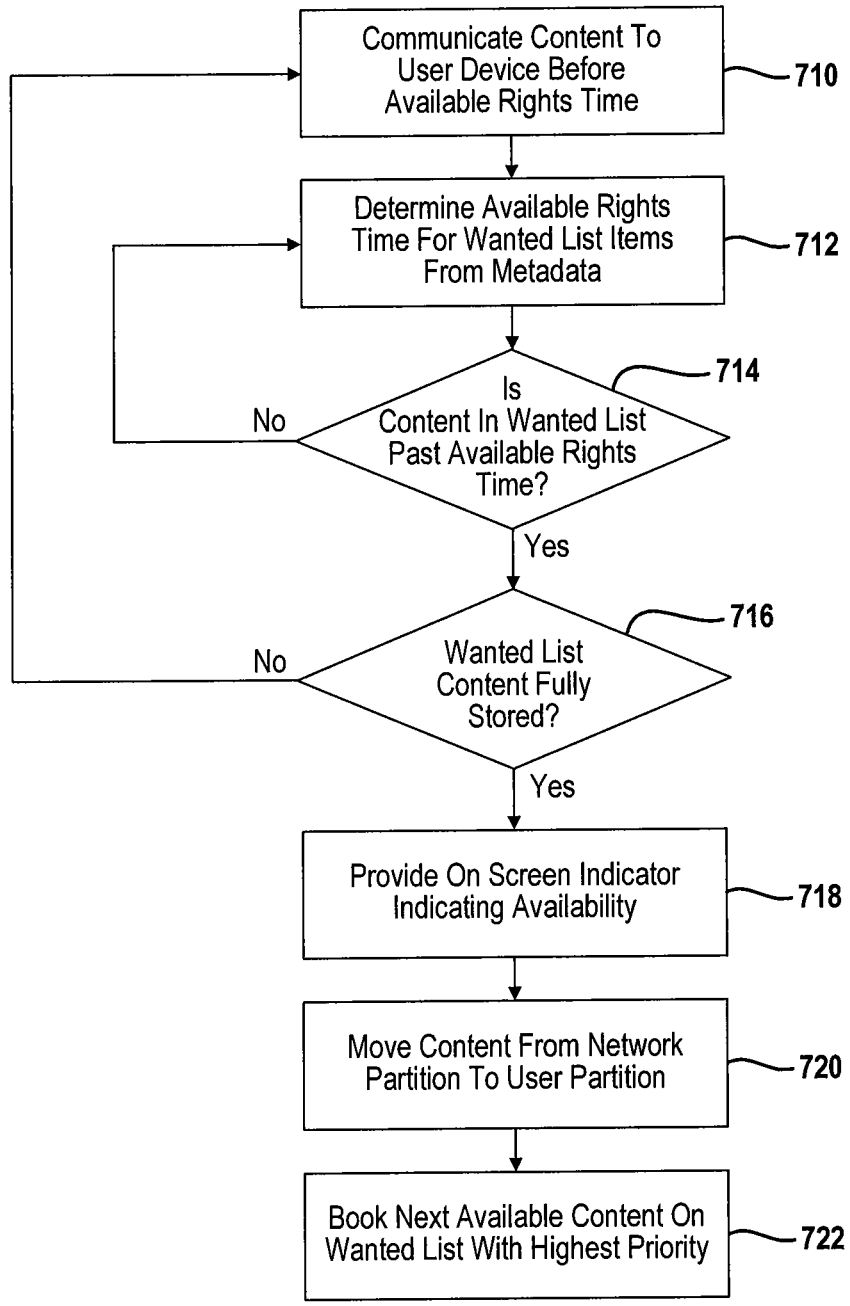
FIG. 7 is a flowchart of a method for displaying content and moving content from a network partition to a user partition.

Referring now to FIG. 7, a method for receiving content is set forth. In step 710, content is communicated to the user device before the available rights time. The content may be push content or content that is listed on the wanted list. The content, as well as metadata, may be communicated in step 710.

In step 712, the available rights time for the wanted list is determined from the metadata. In step 714, when the current time is not past the available rights date, step 714 is repeated. That is, the current time is continually compared to the available rights date so that any content that becomes available for playback from the mailbox is provided on the graphical user interface. In step 716, if the wanted list content is not fully stored, step 710 is again repeated.

In step 716, if the wanted list content is fully stored, step 718 provides an on-screen indicator indicating the availability of the content. An on-screen availability indicator may include a tick or checkmark that is displayed next to the content title on a graphical user interface. As is discussed below, a green-colored checkmark is provided next to the content title to indicate that the content is available for viewing. An on-screen availability indicator may also be associated with a poster or a row ad, indicating that the content is available for viewing. A smart row-ad may be displayed in the program guide when the content is available for viewing, or may not be displayed when the content is not available for viewing. In step 720, the content may be moved from the network partition to a user partition when space is available in a virtual folder or playlist. This process will be further described below in FIG. 8. In step 722, the next available content may be booked when space within the mailbox is free. Booking may include obtaining authorization for downloading content as well as obtaining a location for the content.

Figure 8:
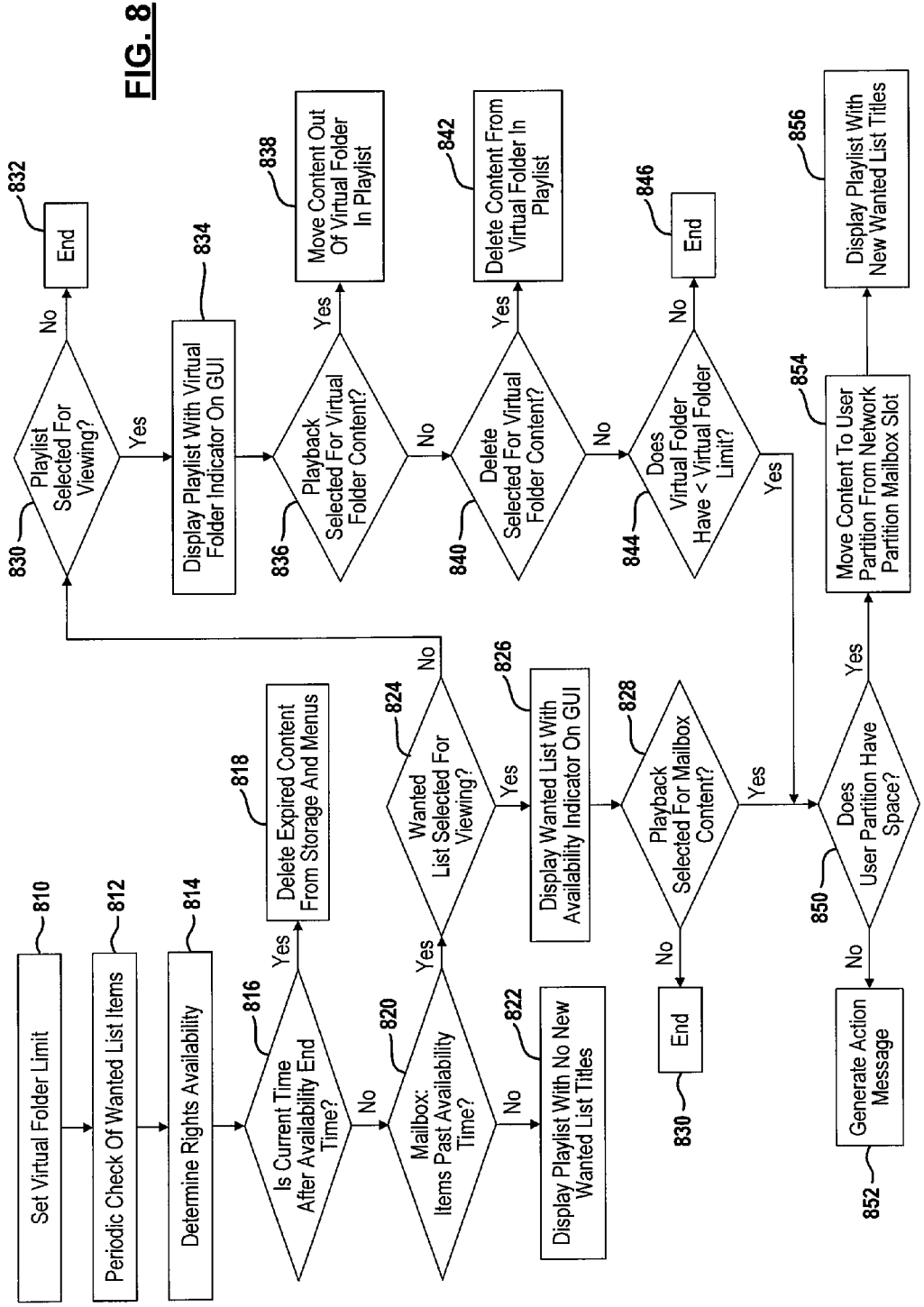
FIG. 8 is a flowchart of a method for displaying content in a wanted list and a playlist.

Referring now to FIG. 8, a detailed method for moving content and storing content within the user device is set forth. In step 810, a virtual folder limit may be established. The virtual folder limit may be set by the content provider or may be set by the user. A user screen display may be provided for the virtual folder. The virtual folder limit is the amount of available content titles from a wanted list queue that may be recorded to a playlist without user interaction. The virtual folder limit thus sets the amount of content that may be automatically transferred from the network partition to the user partition. The virtual folder limit thus protects content in the user playlist from being overwritten when a large number of titles in his wanted list become available for recording. The virtual folder limit does not apply to content from the network partition that is transferred to the user partition when the user selects to playback a mailbox title or to keep a mailbox title for later viewing. When content is transferred from the network partition to the user partition, the mailbox slots in the network partition may be freed and more mailbox content may be downloaded.

In step 812, the status of the wanted list titles in the mailbox and the playlist may be periodically checked by the user device. Step 814 first determines the rights availability time from the metadata associated with the content. Then step 816 compares the current time with the availability end time of the content within the playlist and mailbox slots, to determine whether titles have expired. When the current time is after the availability end time, step 818 is performed. Step 818 may delete the expired content from storage and may remove the expired titles from the various menus within the graphical user interface. The expired content may be deleted from the network partition or the user partition. Referring back to step 816 when the current time for any item is not after an availability end time, step 820 is performed. In step 820, the current time is compared with the availability time of the content within the mailbox slots, to determine whether titles are available for playback or for transferring into the playlist. When the current time is not past the available time, the wanted list, playlist and other menus are displayed with no new wanted list titles highlighted as available in step 822.

In step 820, when the current time is past the availability time for wanted list items in the mailbox, step 824 is performed. Step 824 determines if the wanted list is selected for viewing. The wanted list may be selected for viewing by manipulating the graphical user interface. In step 824, if the wanted list is selected for viewing, the wanted list titles are displayed on the graphical user interface in step 826. Step 826 also displays an on-screen indicator for all wanted list titles that are available in the mailbox for playback, as determined in step 820. After step 826, step 828 determines whether playback for any mailbox content is desired. If playback is not desired for the content that is within the mailbox, step 830 ends the process.

Referring back to step 824, when the wanted list is not selected for viewing, step 830 determines whether a playlist is selected for viewing. The playlist may be selected for viewing by manipulating the graphical user interface. If the playlist is not selected for viewing, the process ends at step

832. When the playlist is selected for viewing in step 830, the playlist titles are displayed on the graphical user interface in step 834. Step 834 also displays an on-screen indicator to identify playlist titles in the virtual folder. After step 834, step 836 determines whether the playback for any virtual folder content is desired. If playback of virtual folder content is desired, then step 838 moves the content from the virtual folder to the general playlist, which are both in the user partition, and step 838 also removes the on-screen virtual folder indicator from the graphical user interface. After step 836 or step 838, step 840 determines whether the user desires to delete content from the virtual folder. If the user desires to delete virtual folder content, then step 842 deletes the content from the virtual folder in the playlist, and removes the title from the playlist display. After step 840 or 842, step 844 determines whether the virtual folder has less than the virtual folder limit. If the virtual folder is not less than the virtual folder limit, the process ends at step 846.

Referring back to step 828 and step 844, when playback is selected in step 828 or when the virtual folder has less than the virtual folder limit in step 844, step 850 is performed. Step 850 determines whether the user partition memory has space for the content. When there is no space for the content within the user partition in step 850, step 852 is performed that generates an action message on the graphical user interface indicating some action must take place before the content may be moved to the user partition. When the user partition does have space in step 850, step 854 is performed. In step 854, the content is moved to the user partition from the network partition mailbox slot. In step 856 the updated Playlist is displayed, including new titles and excluding removed titles.

Figure 9:
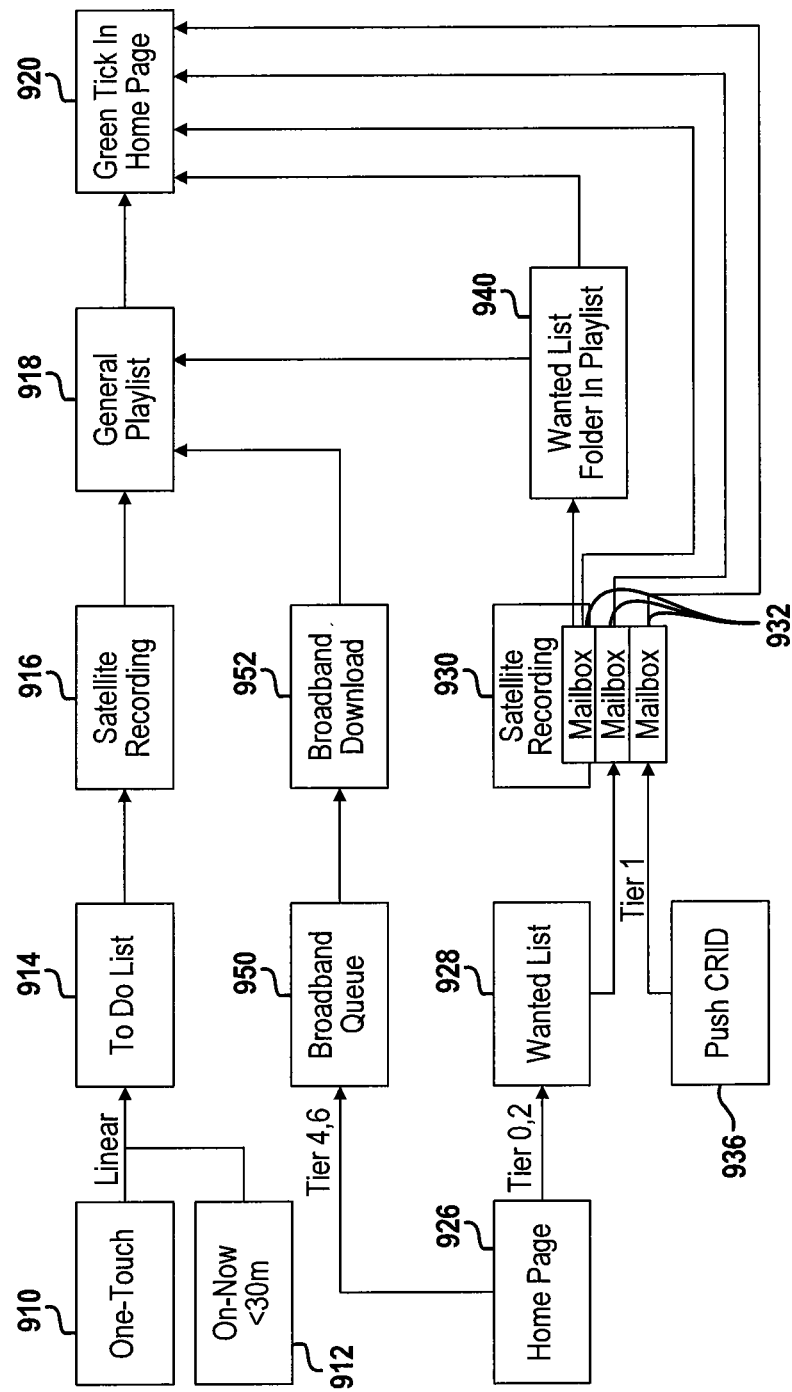
FIG. 9 is a block diagrammatic flowchart of a method for managing a recording within a user device.

Referring now to FIG. 9, the present system may be used in conjunction with other functions of the content distribution system including one-touch recording for linear titles. Linear titles are titles that are broadcasted on regularly scheduled channels at predetermined dates and times which may be tuned to for live viewing. When scrolling through a program guide or various homepages, a linear title may be selected and a one-touch recording may be performed by pressing a record button on a remote control. One-touch recording via the program guide is illustrated as one-touch box 910. A linear title that is less than 30 minutes from broadcast time may also be selected to be recorded using the on-now menu 912. The linear titles may include normally broadcasted linear titles or pay-per-view linear titles. The one-touch recordings or the on-now recordings may be stored within a to-do list. The recordings may be booked as satellite recordings 916 since they are linearly broadcasted titles. The recordings may be provided to a playlist 918 once the titles are saved within the user partition. Linear recordings that are initiated by the user are stored within the user partition. Once a content title has been stored within the user partition, an indicator such as a green tick may be displayed within a homepage to indicate that the content is available for viewing.

The homepage 926 is also illustrated. The homepage may display various titles that are available for viewing or storing or eventual storing within this system. The homepage 926 also represents various menus that are displayed for ordering various content. The on-now menu 912 displays various titles that are stored and available for immediate viewing, as indicated by a green tick. The on-now menu 912 also displays linear titles that may be viewed within 30 minutes. The homepage menus display titles that are available for broadband download over the Internet. The homepage menus also display titles that may be added to a wanted list for recording from the satellite broadcast.

When content is selected from the homepage 926, the tier level of the content may be determined. The tier level of the content may, in this example, correspond to an in-theater (upcoming) title, a broadband-only title, a broadband plus satellite title, a satellite-only title, or a push title. Tier 0 is an in-theater title which corresponds to a future available or upcoming content title. Tier 2 corresponds to a satellite-only title. Tier 4 content is broadband-only content and Tier 6 content is satellite and broadband content.

Tier 0 and Tier 2 titles may be selected and stored within a wanted list 928. When the user device does not have a broadband connection, Tier 6 titles may also be selected and stored within a wanted list 928. The wanted list titles may be recorded from the regular linear satellite schedule. The wanted list titles may also be recorded from a non-linear satellite carousel, comprising of a number of satellite broadcast channels that are not visible in the program guide. A large number of titles may be broadcast over the carousel channels. Unlike the linear channels, the carousel titles are not intended for live viewing, but only for scheduled recording for later viewing. Since they are not viewed live, the carousel titles may be transmitted faster or slower than real-time, allowing an efficient use of available satellite bandwidth. Since they do not appear in a visible program guide, the carousel titles may be transmitted one after the other without wasting transmission time between titles. The titles in the carousel may be repeated once or twice a day, or may only appear once or twice a week, or less frequently, depending on the popularity of the titles. Since they do not appear in a visible program guide, the carousel schedule may be dynamically changed, and the updated schedule may be delivered to the satellite receivers. The carousel schedule may be dynamically changed at the head end in response to broadband or telephone report back of the titles selected in the various user wanted lists.

Box 930 represents satellite recordings based upon wanted list 928 requests which are recorded into the mailbox 932 in the network partition. The wanted list may be prioritized and thus the slots within the mailbox 932 may be recorded in order or when available if the highest level or highest priority content is not available. Once the content is recorded in a mailbox slot, an indicator such as a green tick or the like may be displayed on the homepage display. When a higher priority title is available, a lower priority recording in a mailbox slot may be deleted to provide storage for the higher priority content.

Satellite recording 930 may also be performed using push content in box 936. Push content may be referred to as Tier 1 content and is stored within the network partition. Push content 936 is provided to the user device without being specifically requested. The push content may be communicated based upon preset criteria such as user preferences or previously recorded content. Push content may be Tier 1 and may also be stored within the mailbox slots 932. Once the satellite recordings are stored within the mailbox slots 932, the wanted list or virtual folder within the playlist 940 may receive the content titles when space is available. As mentioned above, a predetermined number of slots for mailbox titles may be provided. When slots are available within the wanted list or virtual folder, content is moved from the network partition to the user partition. Green ticks or indicators may also be provided when content is moved from the mailbox to the virtual folder within the playlist.

Referring back to the homepage 926, when the content is Tier 4 or Tier 6 and the user device has a broadband connection, the content titles may be selected for immediate downloading and viewing. A number of titles may be stored within a broadband queue 950. These titles may be stored within the broadband queue 950 prior to downloading through the broadband connection 952. When content is downloaded and stored from the broadband connection, the content may be immediately available from the user partition and stored within the general playlist 918. Titles that are queued up for broadband download may also be displayed in the general playlist, with a graphical indicator that download is pending.

Figure 10:
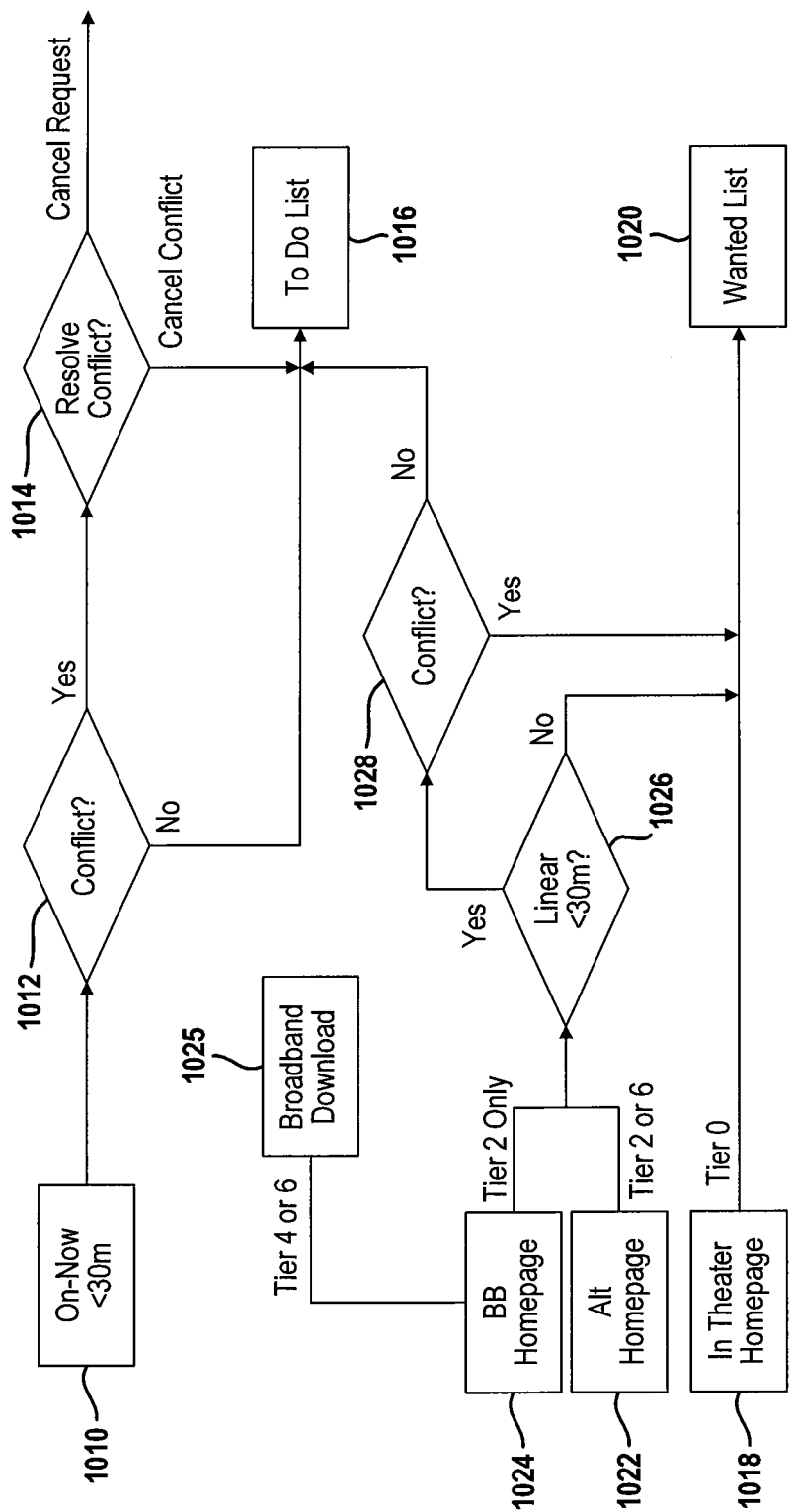
FIG. 10 is a flowchart of a method for managing conflicts within a user device when various recordings are requested.

Referring now to FIG. 10, conflicts may be resolved in various manners when recordings are requested. When selecting on-now content, which is less than 30 minutes from the scheduled broadcast time, and a recording conflict occurs in block 1012, the conflict may be resolved in step 1014. A screen display may be generated so that the user of the user device may resolve the conflict or cancel a recording which causes the conflict. A selection may be provided to the user for selecting one of the conflicting content titles for cancellation. When the conflict is resolved in step 1014 or no conflict exists in step 1012, the recording request is added to the to-do list 1016 of future scheduled recordings.

Content that is not yet available may also be provided from an in-theaters homepage 1018. This content may be Tier 0 content which is upcoming content and may be added directly to the wanted list 1020 since the upcoming time for broadcast is likely unknown and well into the future. The content in the wanted list will be automatically recorded when a future linear or a non-linear satellite broadcast has no higher priority conflicts.

A broadband homepage 1024 may also be provided for user devices that are connected to broadband. This homepage may be used for selecting Tier 4 or Tier 6 content that is available for broadband download 1025. The broadband homepage 1024 may also be used for selecting Tier 2 content that is only available by satellite.

An alternate homepage 1022 may also be provided for user devices that are not connected to broadband. This homepage may not be used for selecting Tier 4 broadband-only content. This homepage may be used for selecting for Tier 2 satellite-only content or Tier 6 satellite and broadband content. Content selected from this homepage by non-broadband connected user devices may only be received by satellite. If satellite content selected from either homepages 1022 or 1024 includes a linear broadcast that starts less than 30 minutes from the current time in block 1026, then block 1028 is executed. In block 1028, it is determined whether a conflict exists. If no conflict exists, the content is added to a to-do list in step 1018. In block 1026 if the content is not linear and within 30 minutes or in block 1028 if a conflict exists for a linear broadcast that starts within 30 minutes, the content is added to the wanted list in step 1020. It should be noted that when a conflict exists in step 1028, the content may still be added to the wanted list 1020 and thus the content may be recorded at a different time.

Figure 11:
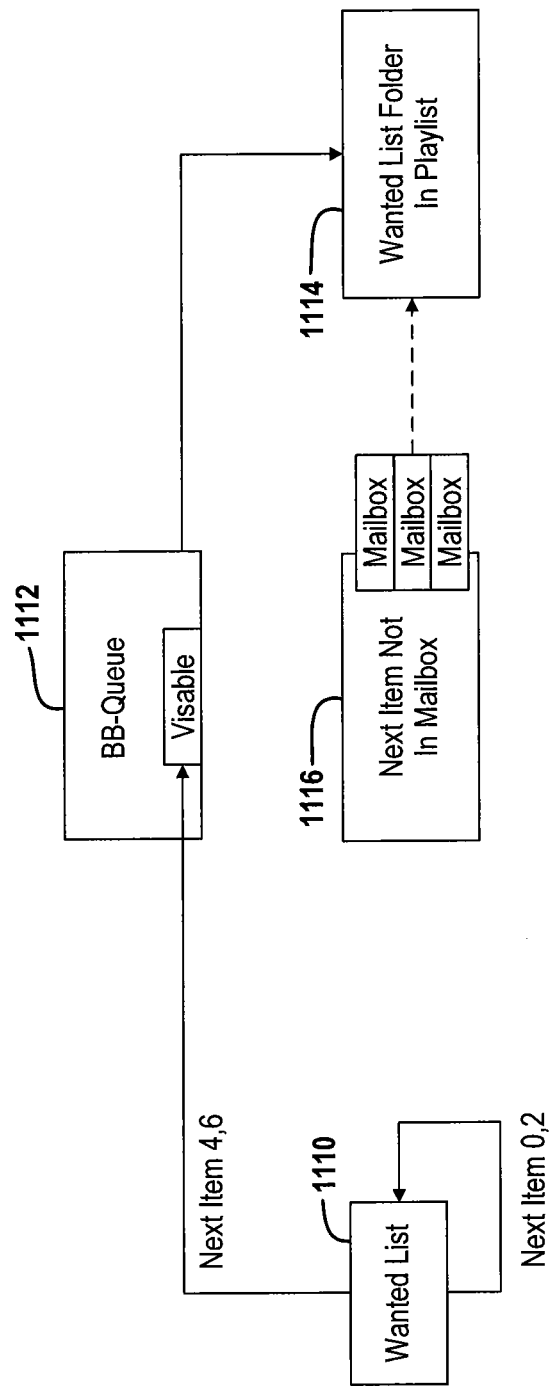
FIG. 11 is a flowchart of a method for downloading a next wanted list item.

Referring now to FIG. 11, as referred to above, when the wanted list has a content title that is Tier 0 or Tier 2 which corresponds to upcoming content or satellite-only content, the item remains on the wanted list 1110. When the next item on the wanted list is a Tier 4 content title or a Tier 6 content title which correspond to broadband-only or satellite and broadband, the content title may be recorded by a broadband-connected user device via the broadband queue 1112. The broadband download in progress may thus be visible in the wanted list virtual folder in the playlist 1114.

When the top wanted list item is not in the mailbox as indicated by box 1116, the above process may be initiated by the broadband download of the top wanted list item into the playlist. The above process is provided for a connected user device.

However, when the user device is not connected and the top wanted list selection is not recorded in the mailbox, the highest priority Tier 2 or Tier 6 content that is already stored in the mailbox moves from the mailbox to the playlist wanted list virtual folder.

Figure 12:
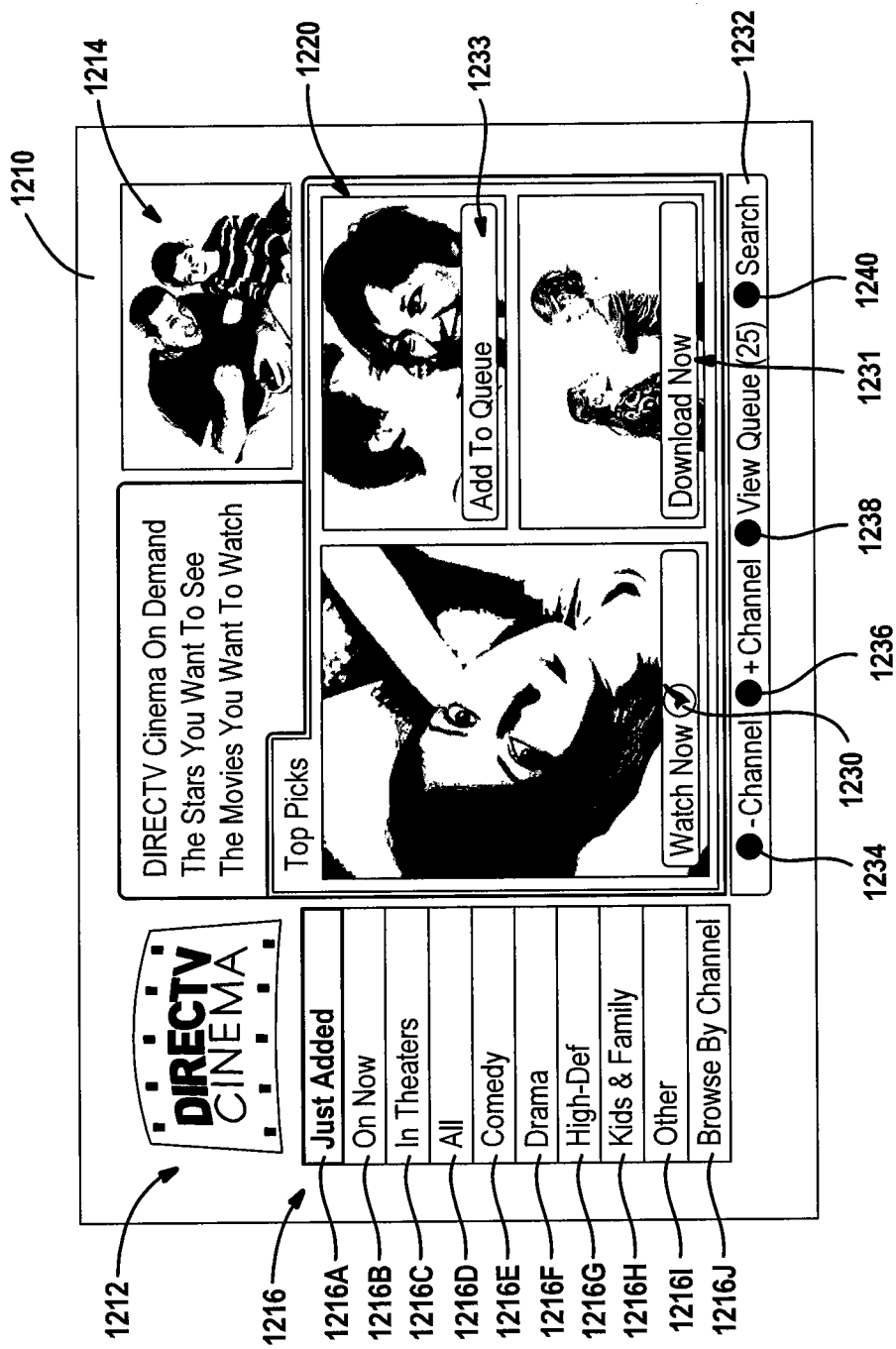
FIG. 12 is a screen display of a cinema homepage according to the present disclosure.

Referring now to FIG. 12, a screen display 1210 that may be displayed on a display associated with the user device is set forth. The graphical user interface may be a homepage for a service such as DIRECTV® cinema as is illustrated by the screen display title 1212. When a homepage or other page is generated, a current channel display 1214 may be generated so that the user may monitor the last channel tuned to. The homepage may also include a category section 1216. The category section 1216 may include various categories including a just-added category 1216A, an on-now category 1216B, an in-theater category 1216C, an all category 1216D, a comedy category 1216E, a drama category 1216F, a high-definition category 1216G, a kids and family category 1216H, an other category 1216I, and a browse-by-channel category 1216J. The number of categories and the category titles may vary depending upon various system requirements and preferences.

Movement between the various categories by a highlighted box 1242 may be provided. By moving the arrow keys on a user interface device, such as a remote control device, the highlighted box may be moved. The select key on the remote control device may be used to select the highlighted box so that a page corresponding to the highlighted category may be selected. Other remote control functions, such as play or record, may be performed using the remote control device. Selecting one of the categories on the display may bring up another display with lists of content and the like as will be illustrated below.

The homepage display 1210 may also include a top pick portion 1220 which displays posters of recommended titles that are available for immediate viewing or that can be selected for recording. Only three top picks are illustrated with posters in this portion. However, various numbers of displays may be provided. Indicators 1230 and text in the selection box over the poster may indicate that the content is able to be watched immediately. That is, the indicator 1230 indicates that the content is stored within the memory of the user device. The content may be stored in the mailbox slots of the network partition or within the user partition. The remote control device may be used to move the highlighted box over the desired poster, to select the title for watching. Alternately, if the content is not stored within the memory of the user device, indicator 1230 may not appear, and alternate text in the selection box over the poster may indicate that the title may be selected for downloading over broadband as illustrated in 1231 or selected for adding to the wanted list as illustrated in 1233.

A navigation section 1232 may include other choices including a channel minus indicator 1234, a channel plus indicator 1236, a view queue indicator 1238 and a search indicator 1240. The channel minus indicator 1234 may be used to reduce the channel by one channel number. The channel plus indicator 1236 may be used to increase the channel by one channel number. The view queue indicator 1238 may be selected to display the wanted list queue. The search indicator 1240 may be selected to initiate a search. The selections for 1234-1240 may be made using a remote control device or another user interface. Colored keys on the remote device may be used for the selection.

The categories under the category section 1216 may have various functions. For example, the newest titles recently added to the homepage may be provided under the "just added" category 1216A. The "on now" category 1216B may provide content that is currently recorded or is about to be broadcasted linearly. The in-theater category 1216C may provide upcoming titles that are not yet available but whose title and other metadata may be viewable, and which may be added to the wanted list for later recording when available. Categories 1216D-J may provide other types of categories and subcategories for content that is currently available. These may correspond to genre or other types of content categories.

Figure 13:
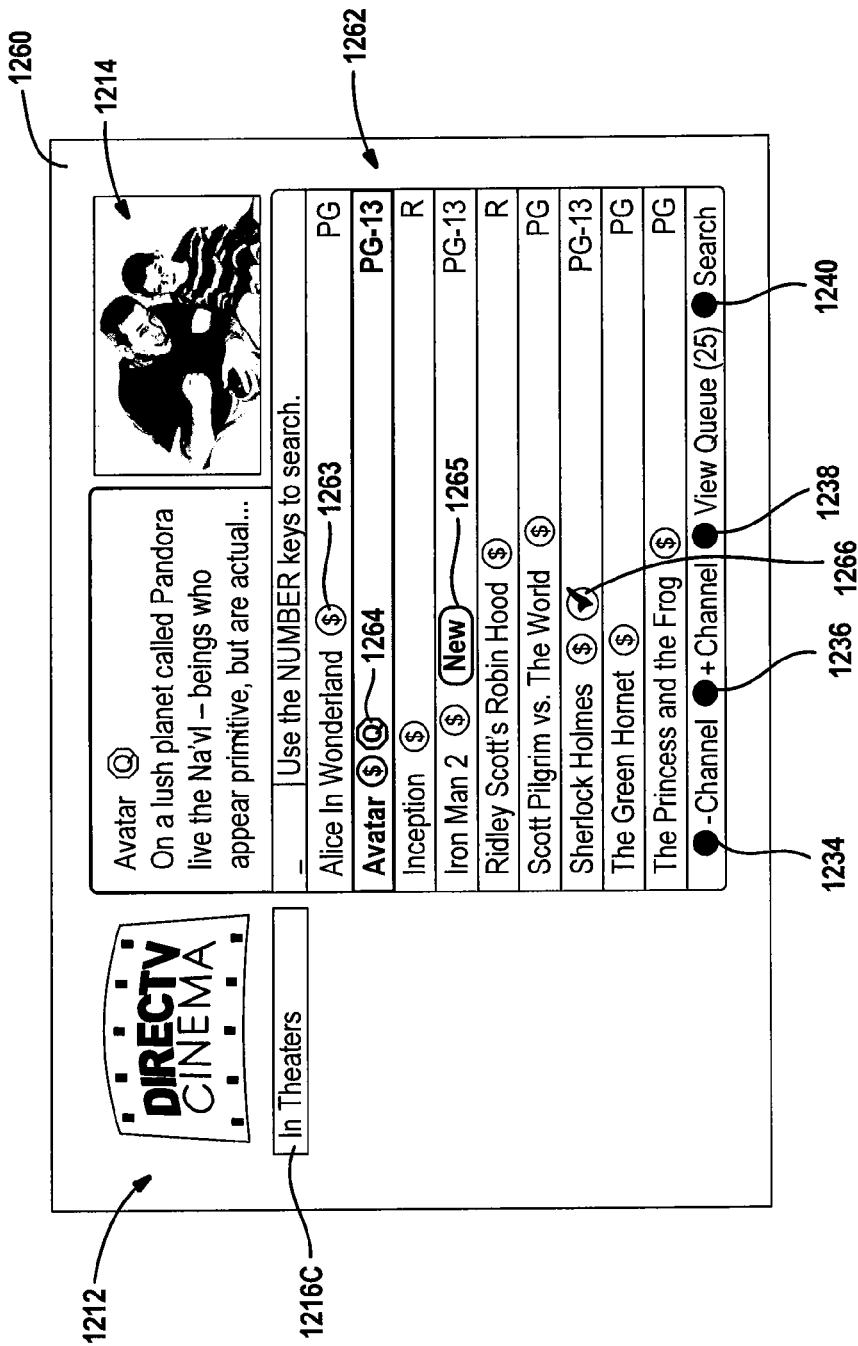
FIG. 13 is a screen display of an upcoming category homepage according to the present disclosure.

Referring now to FIG. 13, an example of a homepage displaying a content title list is illustrated. In this example, an upcoming category or "in-theater category" homepage is illustrated. This user interface may be generated after the in-theater category is selected in the screen display 1210. The screen display 1260 may also include a current channel portion and title portion 1212. A content title portion 1262 illustrates a plurality of content titles that may be available in the future. The content titles may have indicators such as a fee indicator 1263 that indicates the content may be available for a fee. A queue indicator 1264 may also be provided to illustrate that the content is currently within the wanted list queue. A "new" indicator 1265 may also be provided to illustrate that the content title has newly been added to the homepage. An available indicator 1266 may also be provided indicating that content is available and stored within the memory of the user device and may be selected for immediate watching. Various user interface selections may cause various actions to occur. Up and down arrow keys on the user interface may cause the content title display to scroll downward or upward. Pushing a record key on a title may add the content to a wanted list. Alternately, pushing a select key on a title may provide information for the selected program.

Figure 14:
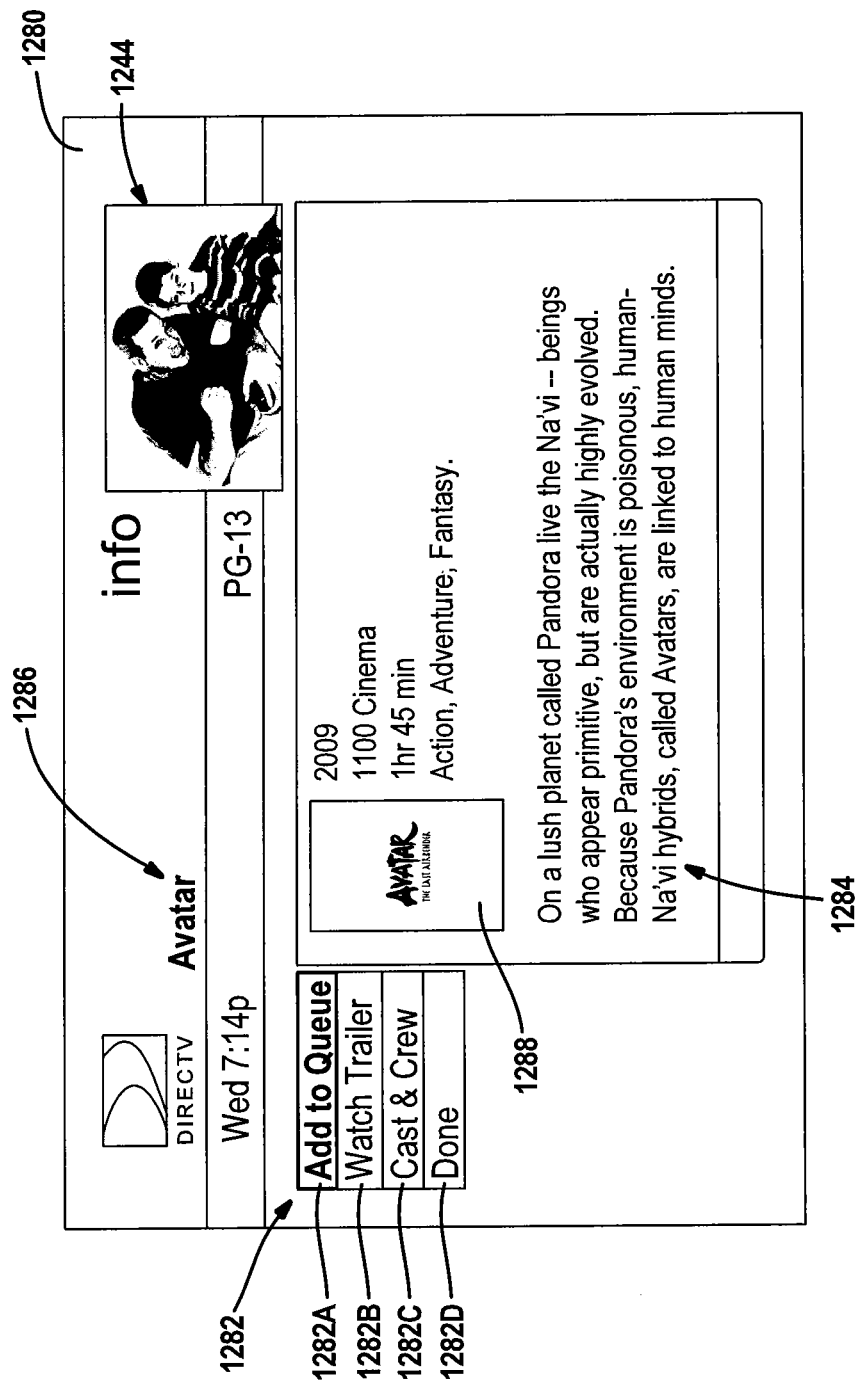
FIG. 14 is a screen display of an information screen for an unscheduled program.

Referring now to FIG. 14, a screen display 1280 for providing information for an unscheduled program is illustrated. An information category section 1282 includes a plurality of information categories such as an add-to-queue category 1282A. The add-to-queue category, when selected, adds the content to a queue or wanted list. A watch trailer category 1282B initiates the watching of a video trailer that describes the content. The cast and crew category 1282C generates a screen display corresponding to the category. The done category 1282D returns to another user display from the information screen.

A data program display portion 1284 displays data about the content title which is displayed in the content title portion 1286. The data portion 1284 in this example displays a date, a channel category, a time, a genre and a description of the content. A poster 1288 may also be displayed.

Figure 15:
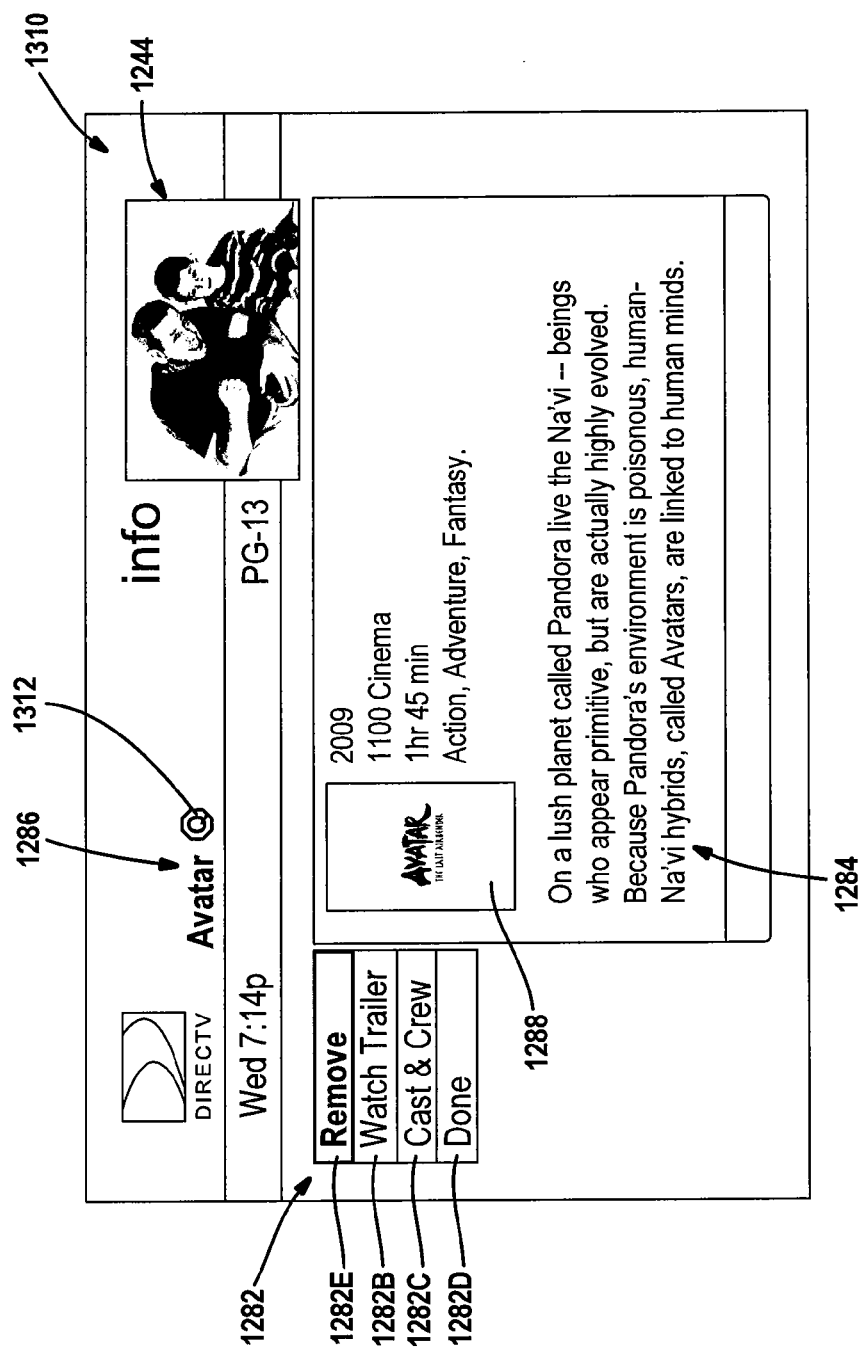
FIG. 15 is a screen display of an information screen for a program in a wanted list.

Referring now to FIG. 15, an information screen display 1310 for content that has already been added to the wanted list queue is set forth. In this example, two changes are different from FIG. 15. The information category section 1282 now includes a removed category 1282E rather than the add to queue category 1282A illustrated in FIG. 15. Further, a queue indicator 1312 may also be provided. In this example, the queue indicator 1312 is displaying adjacent to the title 1286.

Figure 16:
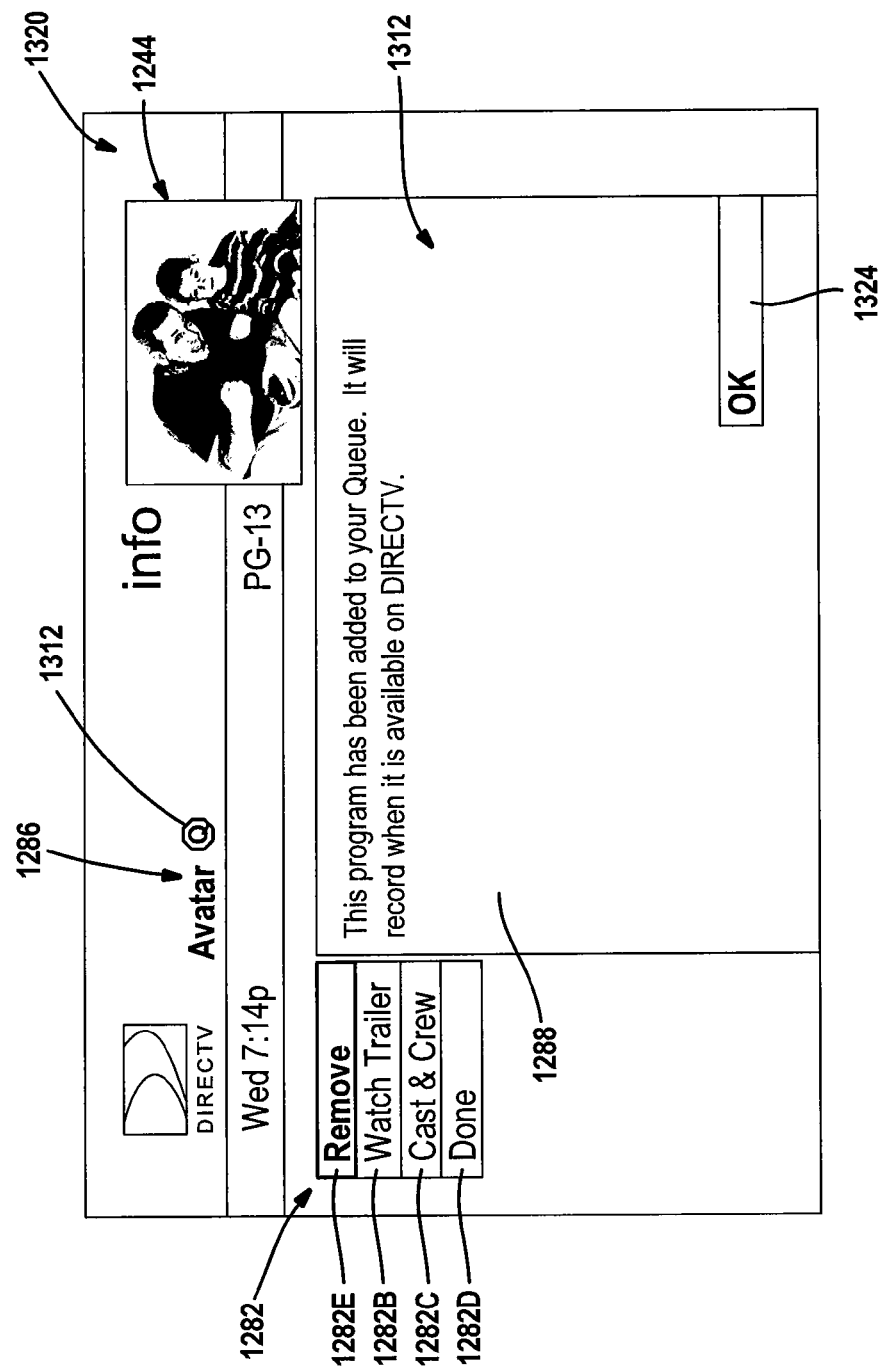
FIG. 16 is a screen display of a confirmation screen for a program that has been added to a wanted list.

Referring now to FIG. 16, a wanted list confirmation screen display 1320 is illustrated. A similar information category section 1282, title section 1286 and queue indicator 1312 may be provided. The wanted list confirmation screen display 1320 may be provided after a program content has been selected for adding to the wanted list. A message to that effect may be provided on the user interface.

A wanted list confirmation screen display 1320 may be provided when selecting the add to queue category 1282A in FIG. 14. A wanted list confirmation screen display 1320 may also be provided when pushing the record button on a content title portion 1262 of FIG. 13 or on a wanted list poster 1233 in a top picks portion 1220 of FIG. 12. A wanted list confirmation description section 1322 may provide a description to prompt the user to confirm the addition of the content title to the wanted list. A confirmation indicator 1324 may be selected to confirm the selection and add the content title to the wanted list.

Figure 17:
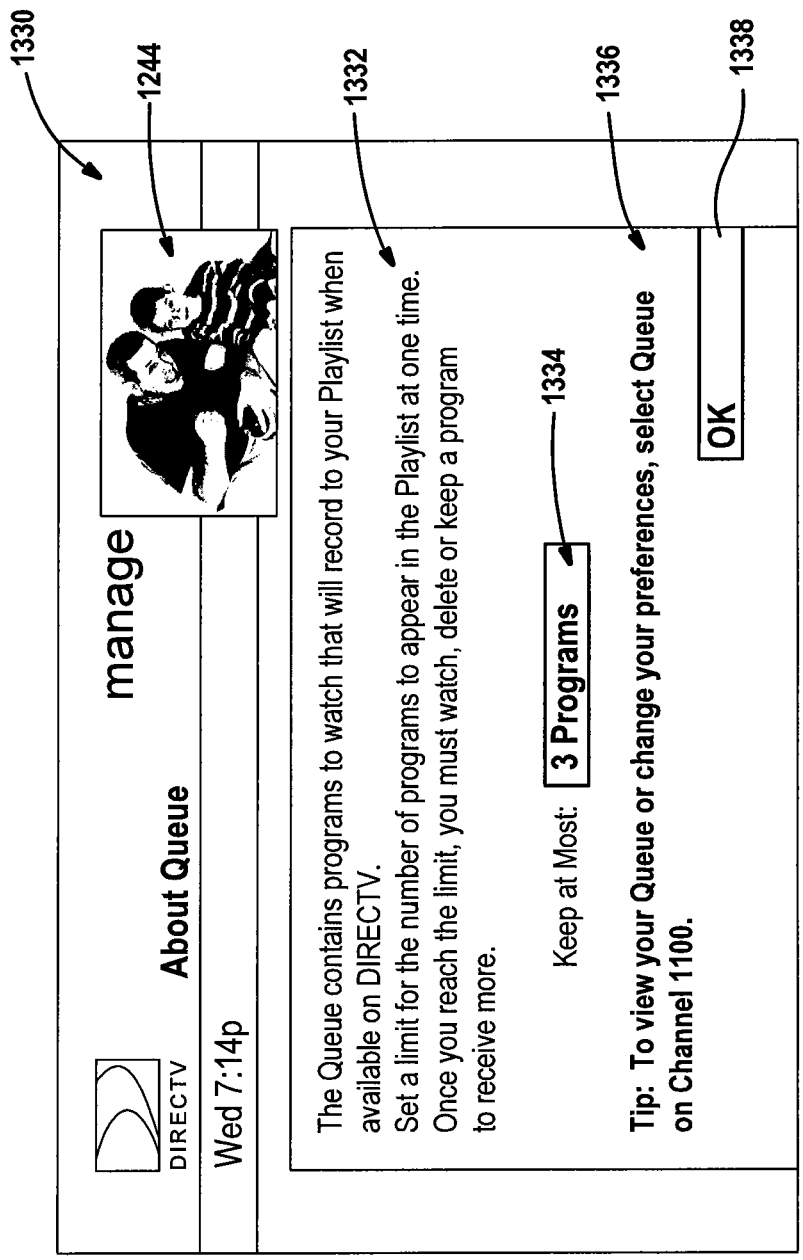
FIG. 17 is a screen display of information about a wanted list queue.

Referring now to FIG. 17, "About Queue" screen display 1330 is illustrated. The "About Queue" screen may be displayed at various times including when the first time a content title is added to the wanted list. The "About Queue" screen display 1330 may include a description portion 1332 to inform the user that a number of programs may appear in the play list from the wanted list. A selector box 1334 may be changed to correspond to the desired amount of programs to appear in the play list from the wanted list queue. In this example, three programs have been selected by the user. The selector box 1334 may change at the prompt of the user. A tip portion 1336 may also be added to the screen display 1330. The tip portion 1336 may generate a tip such as a tip regarding the wanted list queue and where to access the wanted list queue. An "OK" selector box 1338 may also be provided on the screen and will allow the user to return to the previous menu.

Figure 18:
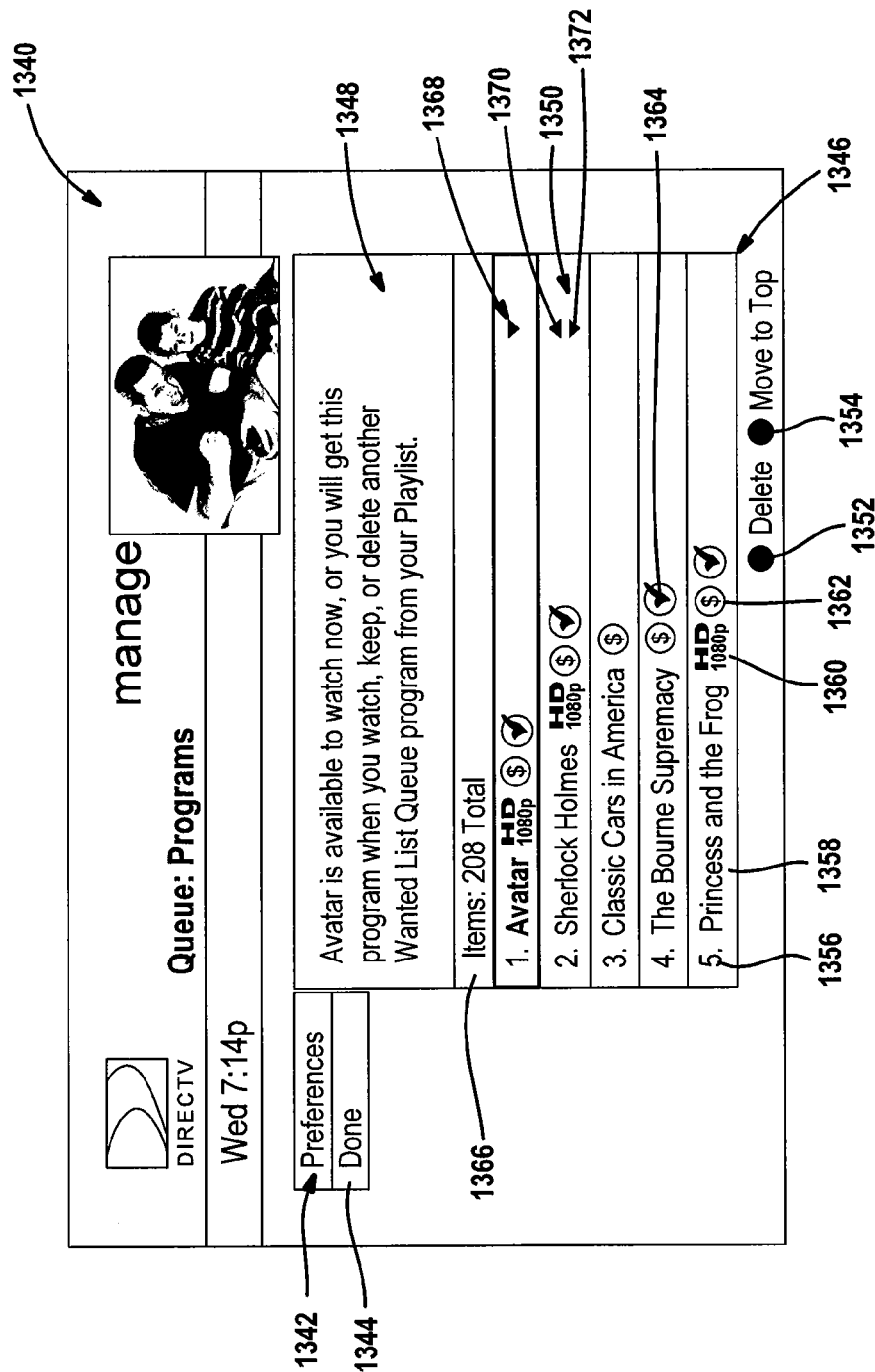
FIG. 18 is a screen display of a wanted list queue.

Referring now to FIG. 18, a "Queue: Programs" wanted list queue screen display 1340 is illustrated. The wanted list queue screen display may include a preferences selection 1342 and a "done" selection 1344. The wanted list queue screen display may display a list of content titles 1346 in the wanted list. The content titles in the wanted list display 1346 may be in priority order. In this example, the top content title has the highest priority, the second title has the second priority and so on. An instruction text portion 1348 that provides instruction text may also be provided. In this example, the instructions for the highlighted content title 1350 are provided. A delete key 1352 may be selected to delete a highlighted content title from the content title list. A move-to-top key 1354 may be selected to move the content to the top of the content title list.

The content title list 1346 may include a numeric place 1356 which provides a relative indicator as to the title within the wanted list queue. The content title list 1346 may also include the content title 1358, an indicator as to the definition such as high-definition or standard definition 1360, a pay indicator 1362 indicating whether the content is free or pay, and an available indicator 1364 indicating the content is available and stored within the storage device of the user. Content titles displaying an available indicator 1364 may be selected for immediate watching. An entry bar text portion 1366 communicates the amount of content in the wanted list queue.

The wanted list queue may be manipulated by the user. An arrow indicator 1368 may allow the user to move the content within the wanted list queue. By selecting the arrow indicator 1368, the first title in the list may be moved down. Content that is not the first title on the list may be moved up or down by selecting an arrow indicators 1370, 1372. Arrows 1370, 1372 may be provided for moving content up or down one position.

Figure 19:
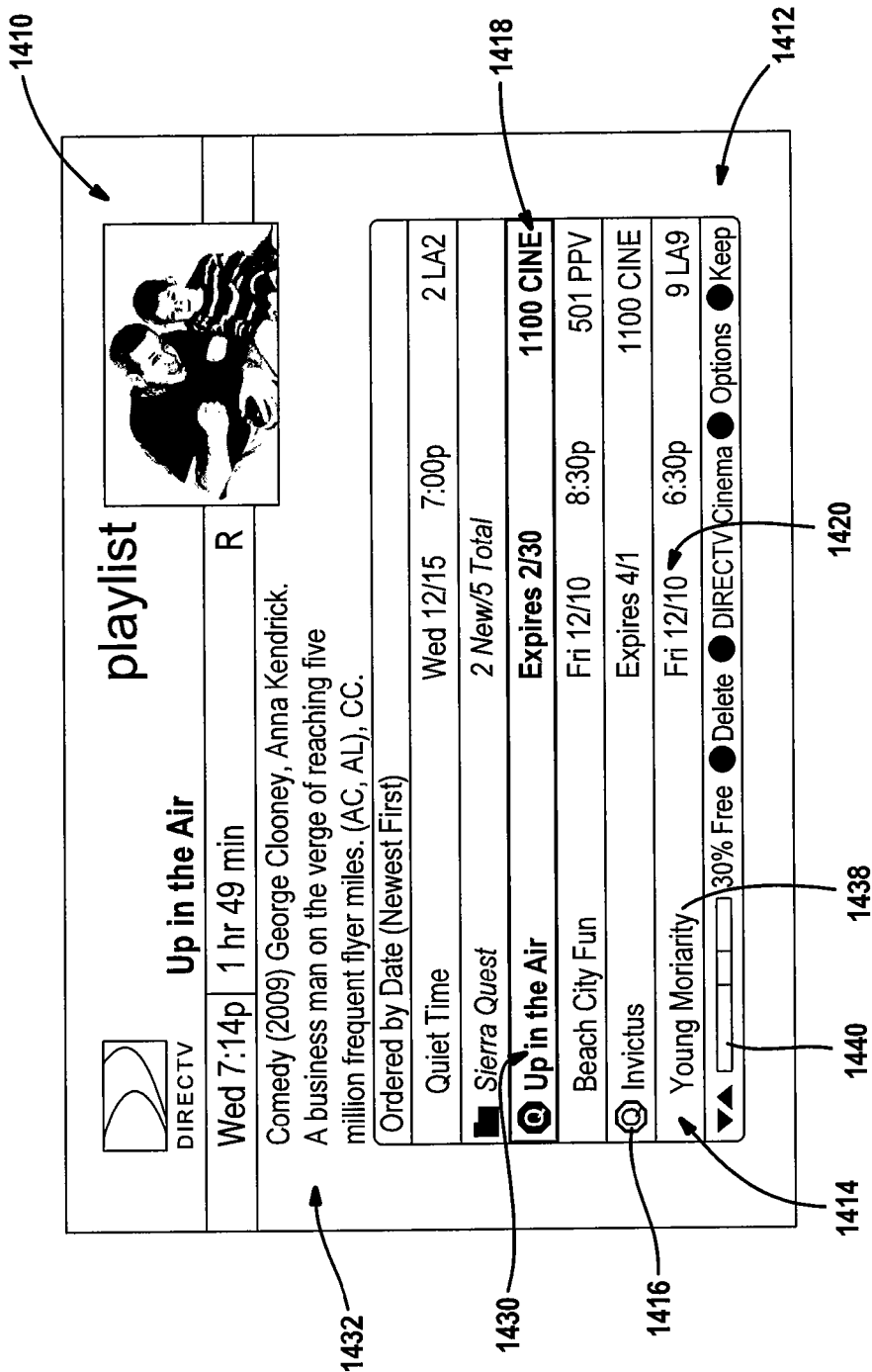
FIG. 19 is a screen display of a playlist.

Referring now to FIG. 19, a playlist screen display 1410 is illustrated. The playlist screen display is the playlist for the storage device. The playlist screen display may have a content list 1412 that corresponds to all of the saved content available in the user partition of the recording device such as a digital video recorder. The content list 1412 may include a location indicator 1414. Content that is stored within the virtual folder may also be displayed. The virtual folder content may be displayed with a queue indicator 1416 to indicate the content is from the wanted list. The content list 1412 may include a channel indicator 1418 to indicate the channel the content was originated from, for example, if the content was selected for recording from a linear channel or if the content was added to the wanted list from the DIRECTV® cinema homepage. As described above, only a certain number of content titles from the wanted list may be displayed within the queue. These correspond to the virtual folder of the playlist. In the above example, three wanted list titles appear in the playlist. A title portion 1418 may also be provided. The title portion may include the title of the content. A data portion 1420 that includes a description of the content may be provided. The data portion may include different types of information for different types of content. For example, linear content may have the date and time as well as the network that the content was recorded from. An expiration date may be also be included that indicates when the content is no longer available for playback. The expiration date may correspond to an availability end date. The content selector 1430 may be scrolled up and down to scroll the list. The content selector 1430, when on a desired content title, may be manipulated by a user interface device such as a remote control to initiate playback. A play key on a remote control may be selected for playback.

A description portion 1432 may be provided corresponding to a description of the content title that is highlighted by the selector box 1430. The description portion 1432 may also provide usability hints to the user. For example, when the highlighted title is included is included in the virtual folder, the description portion may suggest that additional programs may be provided if the user watches, keeps or deletes a program.

A storage status indicator 1440 may be used to indicate the amount of available storage in the user partition storage device of the user device. The indicator 1440 may also provide an indication of the amount of available storage that is unused and the amount of available storage comprising content that that may be automatically deleted by the user device to make room for additional recordings. The indicator may also provide an indication of the amount of storage comprising content that is marked to keep, and which may only be deleted by the user. The indicator may also provide an indication of the amount of storage comprising content that is marked to keep, but that may be automatically deleted when it expires, after the availability end date.

When the playlist is selected for viewing and a title is available in the wanted list, the title may be provided to the virtual folder within the playlist for display on the playlist. The movement of the title from the mailbox slot to the virtual folder within the playlist may take place upon viewing so that the latest and highest ranked content is provided to the playlist from the wanted list.

Figure 20:
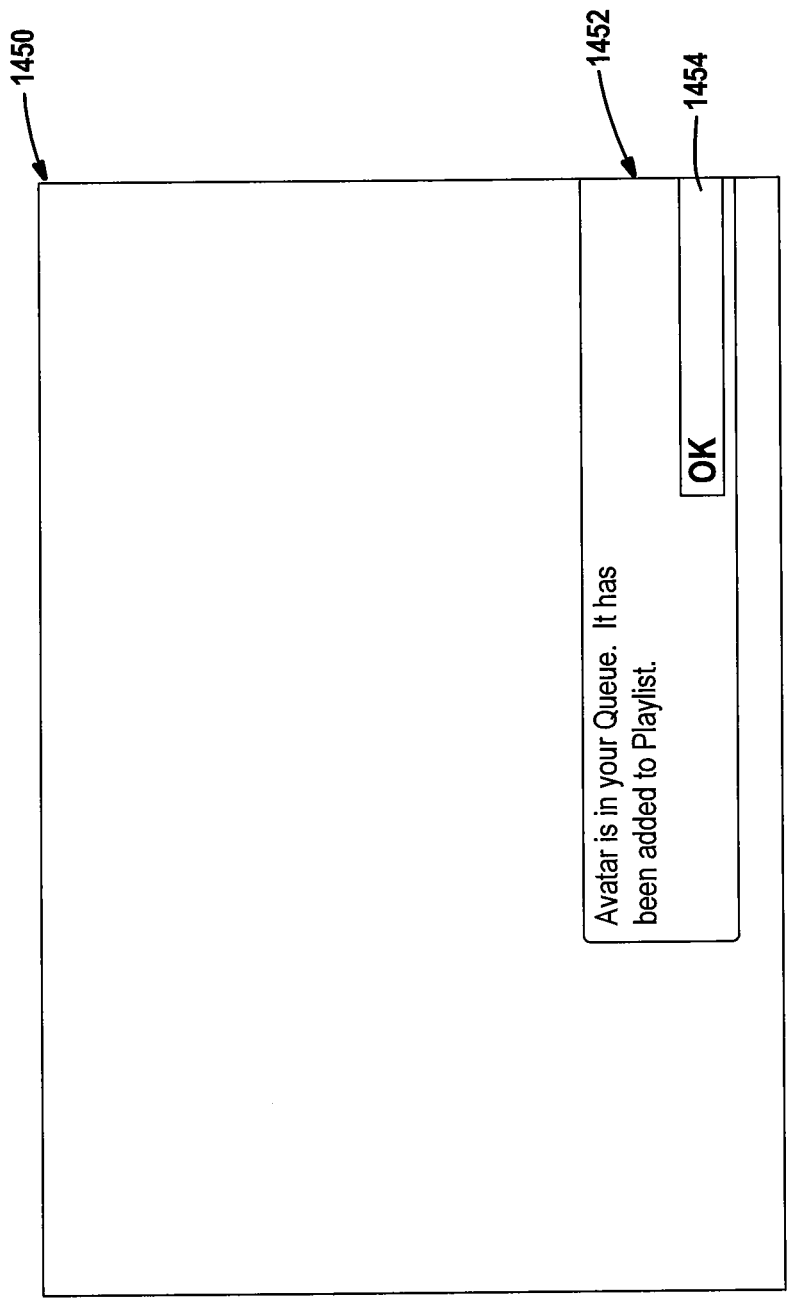
FIG. 20 is a screen display of a confirmation screen for a wanted list program that has been added to a playlist.

Referring now to FIG. 20, an on-screen display 1450 may be displayed when a wanted list program is selected for watching. As described earlier, wanted list programs displaying an available indicator on a row ad or a smart row ad may be selected for immediate viewing from the program guide display. From FIG. 12, wanted list programs displaying an available indicator 1230 may be selected for immediate viewing from the top pick portion 1220 of the homepage 1210. From FIG. 13, wanted list programs displaying an available indicator 1366 may be selected for immediate viewing from a content title portion 1262 of a homepage. From FIG. 18, wanted list programs displaying an available indicator 1364 may be selected for viewing from the wanted list display 1340.

When a wanted list program in the network partition is selected for viewing, it is moved to the user partition playlist. A message display 1452 that indicates a title has been added to the playlist may be provided. A selector box 1454 such as an "OK" box may be provided to return to the previous menu. This display may be an optional display.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
communicating a plurality of upcoming content metadata that includes a content title for a first content;
displaying the upcoming content metadata for the first content;
selecting at least one upcoming non-linear content metadata from the plurality of upcoming content metadata to form selected data;
communicating the selected data from a plurality of user devices to a head end;
aggregating selected data from the plurality of user devices to form aggregated data;
forming a carousel for repeatedly and continually communicating the first content to a plurality of user devices according to carousel communication parameters;
based on the aggregated data, adjusting said carousel communication parameters for the first content associated with the selected data, said carousel communication parameters comprising at least one of repetition rate of the carousel, a frequency of the carousel, and a communication speed of the carousel; and
communicating the content to the plurality of user devices based on the carousel communication parameters.

2. The method as recited in claim 1 wherein displaying the upcoming content comprises displaying the upcoming content title in a homepage on a display associated with the user device.

3. The method as recited in claim 1 wherein communicating a plurality of upcoming content metadata comprises communicating prior to a content availability time.

4. The method as recited in claim 1 further comprising displaying an availability indicator after a content availability time when the content is stored within the user device.

5. The method as recited in claim 1 wherein communicating a plurality of upcoming content metadata comprises communicating a plurality of upcoming content trailers.

6. The method as recited in claim 1 wherein communicating a plurality of upcoming content metadata comprises communicating a plurality of upcoming content posters.

7. The method as recited in claim 1 wherein displaying the upcoming content metadata comprises displaying the content on a display associated with the user device.

8. The method as recited in claim 1 wherein displaying the upcoming content metadata comprises displaying the content on a display associated with an external device in communication with a web interface.

9. The method as recited in claim 1 further comprising forming a wanted list at the user device from selected data.

10. The method as recited in claim 1 wherein communicating the content comprises communicating the content prior to a content availability time.

11. The method as recited in claim 10 further comprising storing the content in a storage device and generating an indicator after storing and after a content availability time.

12. A system comprising:
a plurality of user devices; and
a head end that communicates a plurality of upcoming content metadata that includes a content title of a first content to the user device;
a carousel in communication with the head end for repeatedly and continually communicating the first content to the plurality of user devices according to carousel communication parameters;
wherein the plurality of user devices displays the upcoming content metadata for the first content and forms selected data from at least one upcoming content metadata from the plurality of upcoming content metadata; and the plurality of user devices communicates the selected data to the head ends;
wherein the head end aggregates the selected data;
wherein said carousel communication parameters comprising at least one of repetition rate of the carousel, a frequency of the carousel, and a communication speed of the carousel;
wherein the head end adjusts said carousel communication parameters for the first content associated with the selected data based on the aggregated data and communicates the first content to the plurality of user devices based on the carousel communication parameters.

13. The system as recited in claim 12 wherein the user device displays the upcoming content metadata in a homepage on a display associated with the user device.

14. The system as recited in claim 12 wherein the head end communicates a plurality of upcoming content metadata prior to a content availability time.

15. The system as recited in claim 12 wherein the user device displays an availability indicator after a content availability time after the content is stored within the user device.

16. The system as recited in claim 12 wherein the plurality of upcoming content metadata comprises a plurality of upcoming content trailers.

17. The system as recited in claim 12 wherein the plurality of upcoming content metadata comprises a plurality of upcoming content posters.

18. The system as recited in claim 12 wherein the user device forms a wanted list at the user device from selected data.

19. The system as recited in claim 12 wherein the head end communicates the content prior to a content availability time.

20. The system as recited in claim 12 wherein the user device comprises a content storage device and stores the content in a storage device, the user device generates an indicator after a content availability time for content stored within the storage device.

* * * * *